United States Patent
Verger et al.

(10) Patent No.: US 10,880,379 B2
(45) Date of Patent: Dec. 29, 2020

(54) ACTIVE COMMUNICATION SESSION HANDOVER BETWEEN DIRECT AND RELAYED CONNECTIONS

(71) Applicant: Apple Inc., Cupertino, CA (US)

(72) Inventors: Luciano M. Verger, San Jose, CA (US); Ajoy K. Singh, Milpitas, CA (US); Christopher M. Garrido, San Jose, CA (US); Najeeb M. Abdulrahiman, Fremont, CA (US); Ming Jin, Saratoga, CA (US); Anil G. Naik, San Jose, CA (US); Deepak Chitlur Lakshman, San Jose, CA (US); Srinivasan Vasudevan, Sunnyvale, CA (US); David L. Biderman, San Jose, CA (US); Gurtej Singh Chandok, Sunnyvale, CA (US); Patrick Miauton, Redwood City, CA (US); Eric A. Allamanche, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/200,507

(22) Filed: Nov. 26, 2018

(65) Prior Publication Data
US 2019/0141137 A1 May 9, 2019

Related U.S. Application Data

(63) Continuation of application No. 15/258,753, filed on Sep. 7, 2016, now Pat. No. 10,142,423.
(Continued)

(51) Int. Cl.
*H04L 29/08* (2006.01)
*H04W 36/26* (2009.01)
(Continued)

(52) U.S. Cl.
CPC .......... *H04L 67/14* (2013.01); *H04L 65/1083* (2013.01); *H04L 65/80* (2013.01);
(Continued)

(58) Field of Classification Search
CPC ..... H04W 84/12; H04W 4/008; H04W 88/06; H04W 76/02; H04W 36/14; H04W 88/02;
(Continued)

(56) References Cited

U.S. PATENT DOCUMENTS

| 9,107,237 B2 | 8/2015 | Nakayama |
| 2009/0170512 A1 | 7/2009 | Regnier et al. |

(Continued)

FOREIGN PATENT DOCUMENTS

| CN | 101253739 A | 8/2008 |
| CN | 103442397 A | 12/2013 |

(Continued)

OTHER PUBLICATIONS

PCT Patent Application No. PCT/US2016/050537—International Search Report and Written Opinion; PCT/US2016/050537 dated Dec. 14, 2016.
(Continued)

*Primary Examiner* — Margaret G Mastrodonato
(74) *Attorney, Agent, or Firm* — Dickinson Wright RLLP

(57) ABSTRACT

Methods and apparatus to manage communication sessions to handover between a direct connection at a secondary wireless device and a relayed connection to the secondary wireless device via a primary wireless device. A connection manager of a secondary wireless device can trigger transfer of a communication session based on measurements of performance metrics for the communication session. Upon detection of performance degradation in a local connection or a backhaul connection or both, the connection manager of the secondary wireless device can determine proximity of (Continued)

and/or capabilities for connections of the primary wireless device and instigate transfer of the communication session between different connection types, such as between a direct connection and a relayed connection. The transfer of the communication session can occur without user intervention or in response to input from the user without interrupting or reestablishing the communication session.

20 Claims, 10 Drawing Sheets

Related U.S. Application Data

(60) Provisional application No. 62/215,706, filed on Sep. 8, 2015.

(51) Int. Cl.
| | | |
|---|---|---|
| *H04L 29/06* | (2006.01) | |
| *H04W 76/23* | (2018.01) | |
| *H04W 36/00* | (2009.01) | |
| *H04W 84/12* | (2009.01) | |
| *H04W 36/14* | (2009.01) | |
| *H04W 88/04* | (2009.01) | |
| *H04L 12/26* | (2006.01) | |

(52) U.S. Cl.
CPC .......... *H04L 67/148* (2013.01); *H04W 36/03* (2018.08); *H04W 36/26* (2013.01); *H04W 76/23* (2018.02); *H04L 43/08* (2013.01); *H04W 36/14* (2013.01); *H04W 84/12* (2013.01); *H04W 88/04* (2013.01)

(58) Field of Classification Search
CPC .... H04W 88/04; H04W 84/18; H04L 67/104; H04L 67/14
See application file for complete search history.

(56) References Cited

U.S. PATENT DOCUMENTS

| | | |
|---|---|---|
| 2009/0257361 A1 | 10/2009 | Deshpande et al. |
| 2010/0085907 A1 | 4/2010 | Yasumoto |
| 2011/0009114 A1 | 1/2011 | Haartsen |
| 2012/0033607 A1 | 2/2012 | Nakayama |
| 2012/0320763 A1 | 12/2012 | Hong et al. |
| 2013/0107748 A1 | 5/2013 | Dravida et al. |
| 2013/0195005 A1 | 8/2013 | Al-Shalash |
| 2013/0212287 A1 | 8/2013 | Chappelle et al. |
| 2013/0237228 A1 | 9/2013 | Womack et al. |
| 2015/0163712 A1 | 6/2015 | Ljung et al. |
| 2015/0350332 A1 | 12/2015 | Rauenbuehler et al. |
| 2015/0351004 A1 | 12/2015 | Ko et al. |
| 2016/0073286 A1 | 3/2016 | Wang et al. |
| 2016/0219507 A1* | 7/2016 | Hughes ................. H04W 8/005 |
| 2016/0262087 A1 | 9/2016 | Thondapu et al. |
| 2017/0070919 A1 | 3/2017 | Verger et al. |

FOREIGN PATENT DOCUMENTS

| | | |
|---|---|---|
| EP | 2421328 A1 | 2/2012 |
| EP | 2544382 A2 | 1/2013 |
| WO | 2013134668 A2 | 9/2013 |
| WO | 2016144468 A1 | 9/2016 |

OTHER PUBLICATIONS

Singapore Patent Application No. 10201607482W—Written Opinion dated May 4, 2017.
European Patent Application 16844974.2—Extended European Search Report dated Mar. 25, 2019.
Chinese Patent Application No. 201680050557.3—First Office Action dated Apr. 2, 2020.

* cited by examiner

ACTIVE COMMUNICATION SESSION HANDOVER BETWEEN DIRECT AND RELAYED CONNECTIONS

CROSS-REFERENCE TO RELATED APPLICATIONS

This Application is a continuation of U.S. patent application Ser. No. 15/258,753, entitled "ACTIVE COMMUNICATION SESSION HANDOVER BETWEEN DIRECT AND RELAYED CONNECTIONS," filed Sep. 7, 2016, set to issue Nov. 27, 2018 as U.S. Pat. No. 10,142,423, which claims the benefit of U.S. Provisional Patent Application No. 62/215,706, entitled "ACTIVE COMMUNICATION SESSION HANDOVER BETWEEN DIRECT AND RELAYED CONNECTIONS," filed Sep. 8, 2015, the contents of which are incorporated herein by reference in their entirety for all purposes.

This Application is related to the following U.S. patent applications, each of which is incorporated by reference herein in its entirety for all purposes: (1) U.S. patent application Ser. No. 14/475,390, entitled "ANSWERING A CALL WITH CLIENT THROUGH A HOST" and filed Sep. 2, 2014; (2) U.S. patent application Ser. No. 14/501,870, entitled "DYNAMIC BACKOFF IN WI-FI CALLING" and filed Sep. 30, 2014; (3) U.S. Provisional Patent Application No. 62/129,893, entitled "ACCESSORY DEVICE WHICH TRANSITIONS BETWEEN AN AUTONOMOUS MODE AND A COMPANION DEVICE RELAY MODE FOR CELLULAR COMMUNICATION" and filed Mar. 8, 2015; and (4) U.S. patent application Ser. No. 14/724,154, entitled "CLIENT-INITIATED TETHERING FOR ELECTRONIC DEVICES" and filed May 28, 2015.

FIELD

The described embodiments relate generally to wireless communications using electronic devices, including systems and techniques for managing active communication sessions using a direct connection at a wireless device or a relayed connection to the wireless device via another wireless device.

BACKGROUND

Recent technological advances have led to situations where a user has multiple different active wireless devices available for communication, often at the same general location and at the same time. In addition to a smart phone, a user may also simultaneously have a headset, a tablet device, a laptop computer, a desktop computer, a portable media player, and/or one or more other wireless devices, each of which may be able to conduct wireless communications using one or more different radio access technologies (RATs). The multiple different wireless devices can be associated with a common account, and the user can originate outgoing communication sessions or receive incoming communication sessions using one or more of the wireless devices alone or in tandem. For a direct connection, a communication session can be anchored directly from a wireless device through a wireless network to a remote device, while for a relayed connection, the communication session can be anchored at a primary wireless device and relayed through a local connection to a secondary wireless device through which the user communicates. As operating conditions change, such as based on performance changes to a local connection or backhaul connection used by one or more of the wireless devices during the communication session, one type of connection, whether direct or relayed, may provide better performance for the user.

In view of the foregoing, there is a need for wireless devices that are capable of intelligently and efficiently managing communication sessions using different available connections to ensure the best possible user experience.

SUMMARY

Representative embodiments set forth herein disclose various systems and techniques for intelligently and efficiently managing active communication sessions to handover between a direct connection at a wireless device and a relayed connection to the wireless device via another wireless device or vice versa. In particular, the embodiments set forth various systems and techniques for a wireless connection manager executing on a wireless device (or in conjunction with a wireless connection manager executing on another wireless device) to manage active communication sessions with remote devices to switch between different available connections based on performance criteria. The wireless connection manager(s) can be triggered to carry out wireless connection management operations in an automated manner (e.g., according to default, programmed, and/or user settings) or in a reactive manner (e.g., in response to receiving a user input). According to some embodiments, a wireless connection manager can operate by (1) monitoring an active communication session by a secondary wireless device to a remote device using a direct connection via a non-cellular wireless network, (2) detecting a degradation of performance in a local connection or in a backhaul connection of the non-cellular wireless network, (3) determining whether a primary wireless device is in proximity to the secondary wireless device, and (4) continuing the communication session using the direct connection or transferring the communication session to a relayed connection via the primary device based on availability of the primary wireless device and performance of local communication between the primary and secondary wireless devices.

Under various embodiments, a wireless connection manager can also, or alternatively, operate by (1) monitoring an active communication session by a secondary wireless device to a remote device using a relayed connection through a primary wireless device; (2) detecting availability of a non-cellular wireless network; (3) determining whether performance of a local connection and a backhaul connection using the non-cellular wireless network satisfies a performance criterion for the communication session; and (4) continuing the communication session using the relayed connection through the primary wireless device or transferring the communication session to a direct connection to the secondary wireless device via the non-cellular wireless network based on the performance evaluation.

In some embodiments, transfer of the communication session between different connections, such as between the direction connection and the relayed connection occurs without user intervention. In some embodiments, a user of the secondary wireless device is provided an indication of an option to transfer the communication session between different connection types and the transfer occurs based on user input. In some embodiments, performance evaluation of the local connection and/or the backhaul connection via the non-cellular wireless network is performed by one or more of the secondary wireless device or the primary wireless device. In some embodiments, the secondary wireless device and/or the primary wireless device obtains performance information for the local connection and/or the backhaul connection via the non-cellular wireless network from one or more additional associated wireless devices. Each wireless device of a plurality of associated wireless devices used for a communication session can be managed by a separate wireless connection manager internal to the respective wireless device. In some embodiments, the primary and secondary wireless devices operate together to determine whether to transfer an active communication session between a relayed connection through the primary wireless device and a direct connection to the secondary wireless device or vice versa. In some embodiments, the secondary wireless device determines whether to transfer the active communication session from a direct connection to the secondary wireless device to a relayed connection through the primary wireless device, and the primary wireless device executes the transfer by pulling the active communication session to the primary wireless device and relays associated packets to the secondary wireless device. In some embodiments, the primary and/or the secondary wireless device determines whether to transfer an active communication session from a relayed connection through the primary wireless device to a direct connection at the secondary wireless device, where the primary wireless device pushes the active communication session to the secondary wireless device and/or the secondary wireless device pulls the active communication session from the primary wireless device to the secondary wireless device.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described will become apparent from the following Detailed Description, Figures, and Claims.

Other aspects and advantages of the embodiments described herein will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed systems and techniques for intelligently and efficiently managing calls and other communications between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Figure 1:
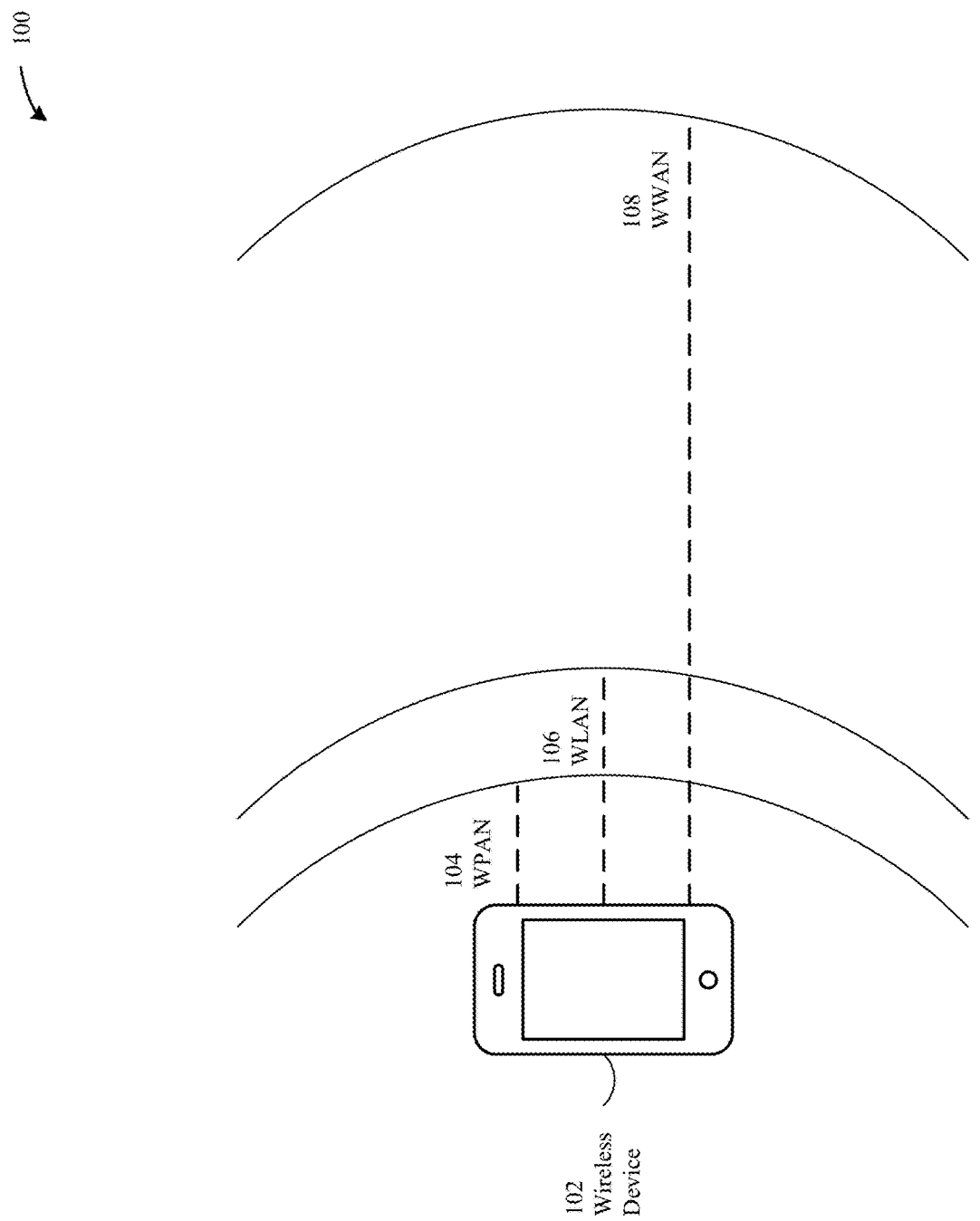
FIG. 1 illustrates in block diagram format a set of overlapping networks for an exemplary wireless device according to various embodiments of the present disclosure.

Representative applications of apparatuses, systems, and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

Wireless devices often provide for a multiplicity of different wireless connections, e.g., wireless wide area network (WWAN) connections via cellular wireless networks (when the wireless device is so equipped), wireless local area network (WLAN) connections, and wireless personal area network (WPAN) connections. Using a relayed connection, a secondary wireless device without (or configured to disable) wireless cellular communication can originate or receive connections through a primary wireless device that provides a wireless cellular connection to a remote device. More generally, the relayed connection can include a local connection between the primary and secondary wireless devices while the primary wireless device provides a remote connection to a remote device, via a circuit-switched legacy wireless connection or via a packet-switched wireless connection, such as provided by voice over Long Term Evolution (VoLTE), by Wi-Fi calling, by Facetime® (video and/or audio), or similar connections. Alternatively, non-cellular wireless connections, such as Wi-Fi calling or Facetime, can terminate directly on the secondary wireless device. A user can choose to move an active communication session between the primary and secondary wireless devices, e.g., by interacting via a user interface of one or both of the primary and secondary wireless devices. Rather than requiring user intervention, it can be preferable for a wireless connection manager in the primary wireless device and/or in the secondary wireless device to dynamically move an active communication session based on monitoring performance of the communication session. When an active communication session that uses a direct connection to a secondary wireless device may be impacted negatively by performance degradation in a local connection between the secondary wireless device and an access point connected to a broadband network and/or in a backhaul connection between the access point and the broadband network, a wireless connection manager in the secondary wireless device can determine whether a relayed connection through a primary wireless device is possible and may provide a higher performance connection. When the primary wireless device is available, e.g., in proximity to the secondary wireless device, is able to provide a local connection to the secondary wireless device, and is also able to establish a remote connection via a wide area network to a remote device with which the secondary wireless device is connected for the active communication session, the secondary wireless device can provide an indication to the primary wireless device to request transfer of the active communication session from a direction connection to a relayed connection. The primary wireless device, in response, can "pull" the active communication session from the direct connection that terminates at the secondary wireless device to a relayed connection through the primary wireless device. The primary wireless device can establish a remote connection to a network-based server with which the active communication session is associated and also establish a local connection to the secondary wireless device in parallel. The active communication session can be transferred from the secondary wireless device to the primary wireless device, which can relay audio, video, and/or data packets for the active communication session to the secondary wireless device using the local connection. When the secondary wireless device determines that performance degradation of the direct connection results (or likely results) from issues on the local connection between the secondary wireless device and the access point, the new local connection established by the primary wireless device to the secondary wireless device can use a different path, e.g., through a WPAN connection such as a Bluetooth (classic or Low Energy) connection or an Apple Wireless Direct Link (AWDL) connection or through a direct WLAN connection established (or to be established) between the primary and secondary wireless devices, such as through a Wi-Fi direct connection or another ad hoc WLAN connection that does not require the use of a central access point. When the secondary wireless device determines that the performance degradation of the direct connection results (or likely results) from issues on the backhaul connection between the access point and broadband network, the new local connection between the primary wireless device and the secondary wireless device can use either a path through the wireless access point, e.g., by a WLAN connection, or a separate alternative path, such as by a supplemental WPAN or direct WLAN connection. Transferring the active communication session from the direct connection to the relayed connection when performance via the direct connection degrades can occur without user intervention or awareness, thereby maintaining continuity and quality for the active communication session using different communication paths as available. In some embodiments, performance required by a service and/or application that uses the active communication session can be accounted for when determining which connection type to use for the active communication session.

In addition to transfer from a direct connection to a relayed connection, an active communication session can also be transferred from a relayed connection to a direct connection, e.g., when such a direct connection becomes available and performance via the direct connection can be higher and/or preferred. Direct connection of a communication session can provide for lower latency and less (or no) transcoding of packets, which can provide for noticeable performance improvements to the user. Direct connection of a packet-based communication session can also use a different communication service than a relayed connection. For example, a direct connection can use a broadband service, while the relayed connection can use a cellular service. As such, depending on user preference, the direct connection can also be preferred due to cost or other reasons. An active communication session that is relayed through the primary wireless device to the secondary wireless device can be transferred to a direction connection to the secondary wireless device in response to determination of availability and satisfactory performance through a non-cellular wireless network, e.g., via a WLAN access point. The secondary wireless device and/or the primary wireless device can initiate transfer of the active communication session. In some embodiments, the primary and/or secondary wireless devices can use measurements obtained by one or both of the primary and secondary wireless devices to ascertain whether a direct connection is possible and may provide performance that is satisfactory, e.g., based on satisfying a performance criterion. In some embodiments, the primary and/or secondary wireless devices obtain performance information from one or more other associated wireless devices to determine whether a direct connection to the secondary wireless device can provide adequate performance for the active communication session.

Accordingly, the foregoing approaches provide systems and techniques for intelligently and efficiently managing connections for wireless devices. A more detailed discussion of these systems and techniques is set forth below and described in conjunction with FIGS. 1 through 8, which illustrate detailed diagrams of systems and methods that can be used to implement these systems and techniques.

Wireless devices, and mobile devices in particular, can incorporate multiple different radio access technologies (RATs) to provide connections through different wireless networks that offer different services and/or capabilities. A wireless device can include hardware and software to support a wireless personal area network ("WPAN") according to a WPAN communication protocol, such as those standardized by the Bluetooth® special interest group ("SIG") and/or those developed by Apple referred to as an Apple Wireless Direct Link (AWDL). The wireless device can discover compatible peripheral wireless devices and can establish connections to these peripheral wireless devices located in order to provide specific communication services through a WPAN. In some situations, the wireless device can act as a communications hub that provides access to a wireless local area network ("WLAN") and/or to a wireless wide area network ("WWAN") to a wide variety of services that can be supported by various applications executing on the wireless device. Thus, communication capability for a secondary wireless device, e.g., without and/or not configured for WWAN communication, can be extended using a local WPAN (or WLAN) connection to a primary wireless device that provides a WWAN connection. Alternatively, the secondary wireless device can also include wireless circuitry for a WLAN connection and can originate and/or terminate connections via a WLAN connection. Whether to use a direct connection or a relayed connection can depend on performance characteristics of one or more links of an active communication session between the secondary wireless device and a remote device. Fewer links (or hops) can provide for lower latency, and thus a direct connection can be preferred; however, unlike a legacy circuit-switched connection that provides a dedicated link, the direct connection via a WLAN can share bandwidth with other wireless devices on the same WLAN and/or with the backhaul connection from the access point that manages the WLAN. When performance on the local WLAN connection link and/or on the backhaul connection degrades, a relayed connection via a primary wireless device can be preferred. By monitoring performance of an active communication session and availability and capabilities of associated wireless devices (such as proximity to a primary wireless device), a secondary wireless device can request transfer of an active communication session between a direction connection and a relayed connection or vice versa.

In accordance with various embodiments described herein, the terms "wireless communication device," "wireless device," "mobile device," "mobile station," "wireless station", "wireless access point", "station", "access point" and "user equipment" (UE) may be used herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) LTE, LTE Advanced (LTE-A), and/or 5G or other present or future developed advanced cellular wireless networks.

The wireless device, in some embodiments, can also operate as part of a wireless communication system, which can include a set of client devices, which can also be referred to as stations, client wireless devices, or client wireless devices, interconnected to an access point (AP), e.g., as part of a WLAN, and/or to each other, e.g., as part of a WPAN and/or an "ad hoc" wireless network, such as a Wi-Fi direct connection. In some embodiments, the client device can be any wireless device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the UEs described herein may be configured as multi-mode wireless communication devices that are also capable of communicating via different third generation (3G) and/or second generation (2G) RATs. In these scenarios, a multi-mode UE can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

FIG. 1 illustrates a set of overlapping wireless networks for a wireless device illustrated in block diagram format. The wireless device 102 can include a combination of hardware and software to provide wireless connections using one or more different wireless networks alone, separately, or in combination, such as via the set of overlapping networks 100. The wireless device 102 can represent a device having wireless communications capabilities, such as a smart phone (e.g., an iPhone®), a tablet device (e.g., an iPad®), a wearable device (e.g., an Apple Watch™), a portable media player (e.g., an iPod®), a laptop computer (e.g., a MacBook®), or a desktop computer (e.g., an iMac®), among other possible devices. Additional wireless devices, which can connect to the wireless device 102 and provide audio, video, and/or data media interfaces can include a wireless headset, a vehicle sound system, a digital television, a digital media recorder, a wearable computing device or any other suitable wireless device capable of wireless communication and input/output capabilities.

The wireless device 102 can include a combination of hardware, software, and/or firmware to provide communication using a WPAN 104, which can provide power efficient connections while operating over a limited distance. WPAN connections can typically provide for connecting the wireless device 102 to peripheral and associated wireless devices, such as headsets, earpieces, supplemental display devices, and supplemental input/output devices, for example. WPAN connections can also be used to relay communication between the wireless device 102 and the peripheral wireless device through which the user can interact for a communication session. A representative WPAN 104 can operate in accordance with a communication protocol specified by the Bluetooth SIG, for example, and/or by Apple such as an Apple Wireless Direct Link (AWDL). The wireless device 102 can also include a combination of hardware, software, and/or firmware to provide communication using a WLAN 106 that can provide a higher data rate and a greater operating range than a WPAN 104. The wireless device 102 can include separate and/or shared hardware, software, and/or firmware elements for the WPAN 104 and the WLAN 106. Both the WPAN 104 and WLAN 106 can operate as "local" wireless networks. The wireless device 102 can also include additional hardware, software, and/or firmware to provide a WWAN 108 capability, such as to interconnect with one or more cellular wireless networks. The wireless device 102 can provide a multitude of services using one or more connections through its wireless networking capabilities. As described further herein, a primary wireless device can include WWAN 108 capability, while a secondary wireless device can not include WWAN 108 capability and instead only provide WLAN 106 and WPAN 104 communication capabilities. The secondary wireless device can communicate with a remote device via a WLAN 106, e.g., directly terminate a connection to the remote device, or the secondary wireless device can communicate with the remote device indirectly via a local WLAN 106 connection or a local WPAN 104 connection to a primary wireless device, which communicates with the remote device via a WWAN 108 connection. As described further herein, an active communication session between a secondary wireless device and a remote device can be transferred between a direct connection and a relayed connection through a primary wireless device with or without user intervention.

Figure 2:
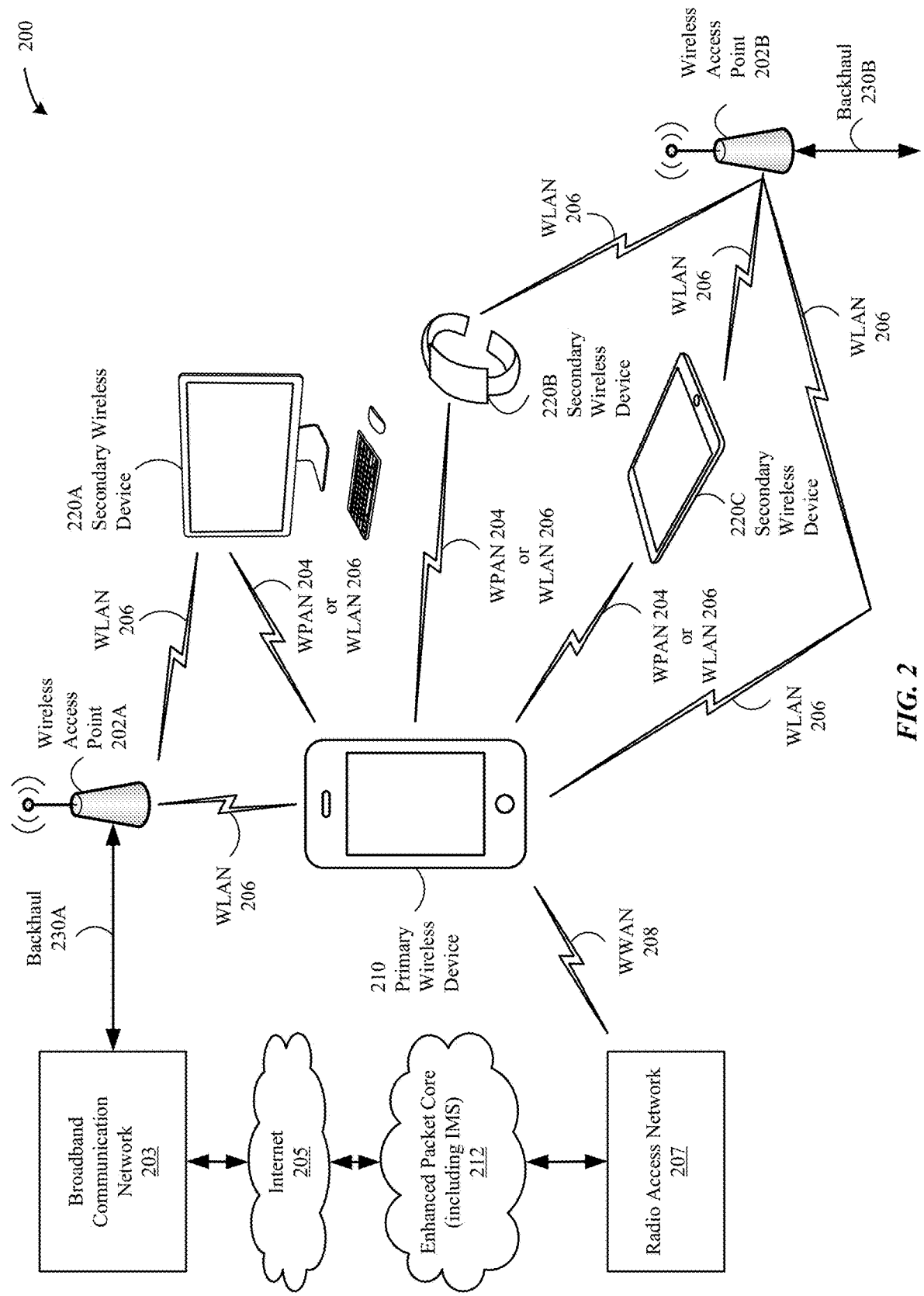
FIG. 2 illustrates in block diagram format an exemplary system of different wireless networks and wireless devices according to various embodiments of the present disclosure.

FIG. 2 illustrates, in block diagram format, an exemplary system 200 including different wireless networks and wireless devices according to various embodiments of the present disclosure. System 200 includes a primary wireless device 210 that can be interconnected through several different wireless communication technologies to an external set of networks and to a set of one or more secondary wireless devices 220A, 220B, and 220C. The primary wireless device 210 can be a "central" device for WPAN purposes and/or can form direct WLAN connections, such as Wi-Fi direct links, to one or more of the secondary wireless devices 220A/B/C. The primary wireless device 210 can receive information from one or more packet-switched wireless networks and/or from one or more circuit-switched wireless networks. For example, the primary wireless device 210 can connect via a WWAN connection 208 through a radio access network 207 and an enhanced packet core network 212, which can include an Internet Protocol (IP) Multimedia Subsystem (IMS) to manage packet connections such as for Voice over LTE (VoLTE). The primary wireless device 210 can use the WWAN connection 208 to access a broad variety of services (e.g., voice calls, text messages, data access, video calls, multimedia messaging, and media streaming). Similarly, the primary wireless device 210 can use a WLAN connection 206 provided through a wireless access point 202A interconnected to a broadband communication network 203 via a backhaul connection 230A to access a similar wide range of services (or through wireless access point 202B interconnected via a backhaul connection 230B to the same (or another) broadband communication network 203. The broad set of services provided through the WWAN connection 208 and/or through the WLAN connection 206 can be extended to one or more secondary wireless devices 220 A/B/C through additional WLAN 206 or WPAN 204 connections, such that a WWAN connection 208 to the primary wireless device 210 can be relayed, e.g., audio, video, text, and/or other media packets can be communicated between the primary wireless device 210 and one or more secondary wireless devices 220A/B/C that provide input/output capabilities for a user.

Each of the secondary wireless devices 220A, 220B, 220C illustrated in FIG. 2 can provide output display capabilities as well as input response capabilities to allow a user of the primary wireless device 210 to interact with various services or otherwise relay connections or communications, such as through one or both of a WLAN connection 206 or WPAN connection 204. For example, any of secondary wireless devices 220A, 220B, 220C can provide call relay functionality for an incoming audio/video/interactive messaging connection or other applicable connection in conjunction with the primary wireless device 210, such that the user can accept an incoming connection or originate an outgoing connection at any of the secondary wireless devices 220A, 220B, or 220C. Such call relay functionality can be facilitated by way of WLAN connections to a host server (e.g., using an iCloud® service) via a common wireless access point 202A and/or 202B, or by the various WPAN connections 204 or direct WLAN connections 206, for example. In addition, one, some or all of the secondary wireless devices 220A, 220B, 220C can be stand-alone independent wireless devices that are able to operate independently of the primary wireless device 210. In one specific non-limiting embodiment, the secondary wireless device 220A can be a desktop computing device, the secondary wireless device 220B can be a wearable computing device, such as an electronic watch, and the secondary wireless device 220C can be a tablet device. It will be readily appreciated that other types and arrangements of wireless devices can be used, and that fewer or more than three such devices can be secondary wireless devices associated with the primary wireless device 210.

Figure 3:
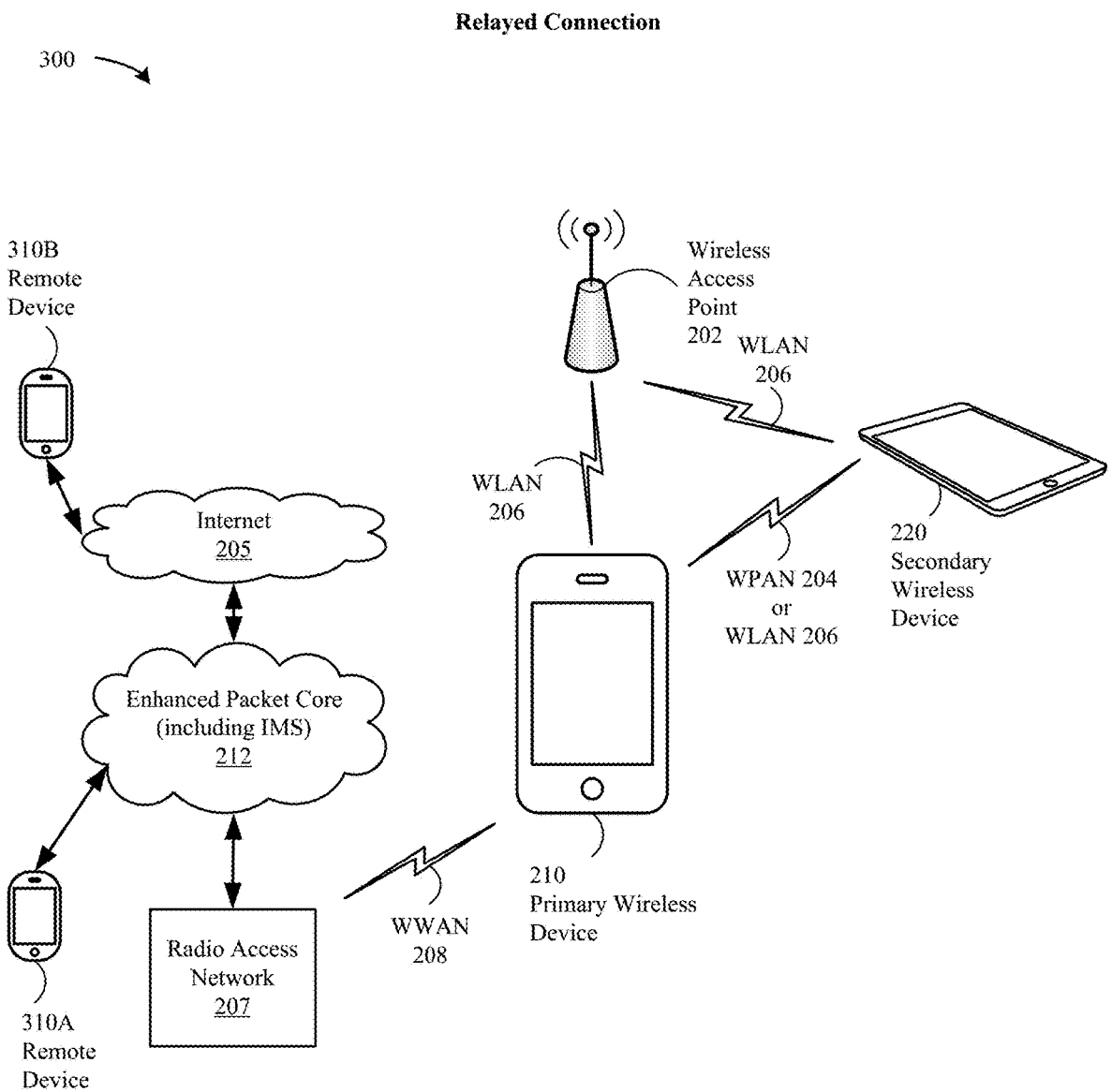
FIG. 3 illustrates in block diagram format a relayed connection between a secondary wireless device and a remote device through a primary wireless device via a non-cellular wireless network and a cellular wireless network according to various embodiments of the present disclosure.
Figure 4:
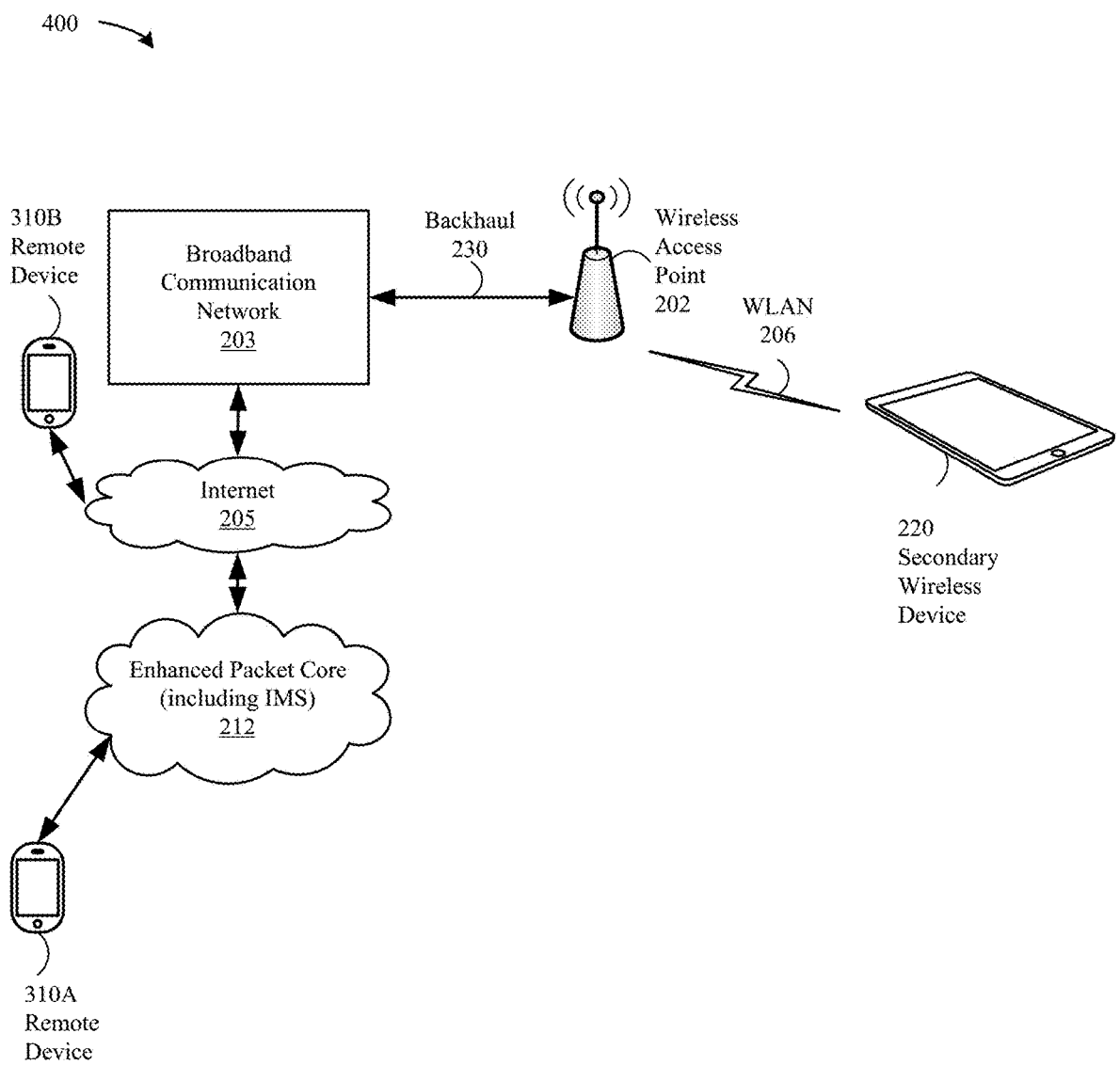
FIG. 4 illustrates in block diagram format a direct connection between a secondary wireless device and a remote device via a non-cellular wireless network according to various embodiments of the present disclosure.

FIG. 3 illustrates in block diagram format a relayed connection between a secondary wireless device 220 and a remote device 310A or 310B through a primary wireless device 210 via a non-cellular wireless network, e.g., via a WLAN 206 connection through wireless AP 202, via a WPAN 204 connection, or via a direct WLAN 206 connection between the primary wireless device 210 and the secondary wireless device 220. The relayed connection also includes a wireless wide area network (WWAN) 208 connection between the primary wireless device 210 and a cellular wireless network that includes a radio access network 207 and an enhanced packet core 212 connected to the Internet 205. The primary wireless device 210 can serve as an anchor for a connection to the remote device 310A or 310B and relay audio, video, data, messaging, media, or other applicable communication packets to the secondary wireless device 220 through which the user can receive and/or generate input/output. The relayed connection can use either the WLAN connection 206 (via wireless AP 202 or direct) or the WPAN connection 204 to extend the connection between the primary wireless device 210 and the remote device 310A or 310B. The WPAN connection 204 can provide limited range, while the WLAN connections 206, either through the wireless access point (AP) 202 or direct, can provide a wider range (as well as higher throughput) for local connection between the primary wireless device 210 and the secondary wireless device 220. When a directly terminated connection to a remote device 310A or 310B via the wireless AP 202, such as illustrated in FIG. 4, can provide acceptable or superior performance to the relayed connection illustrated in FIG. 3 for the active communication session between the secondary wireless device 220 and the remote device 310A or 310B, the active communication session can be transferred from the relayed connection to a directly terminated (also referred to as a direct) connection, e.g., to reduce latency and/or reduce an amount of transcoding required for the active communication session. The communication to and from remote device 310A or 310B can traverse one or more of the enhanced packet core 212, which can include an IMS network element, or the Internet 205. Both circuit-switched connections at a remote device 310A or 310B and packet-switched connections at a remote device 310A or 310B can be used for the communication session. In some embodiments, packets for the communication session are managed by an IMS network element and/or by a network-based server knowledgeable of associations of the primary wireless device 210 with the secondary wireless device 220, e.g., an iCloud server.

FIG. 4 illustrates in block diagram format a direct connection between a secondary wireless device 220 and a remote device 310A or 310B through a wireless AP 202 that is connected via a backhaul connection 230 to a broadband communication network 203 that connects to the Internet 205. The direct connection between the secondary wireless device 220 via the WLAN connection 206 can provide for packet-switched services, such as Wi-Fi calling, Facetime video, Facetime audio, to the remote device 310A or 310B. The direct connection illustrated in FIG. 4 can require fewer links or hops that the relayed connection illustrated in FIG. 3 and thus can provide lower latency and less (or no) transcoding, resulting in better performance observable by a user of a service via the direction connection. When performance of the WLAN connection 206 to the wireless AP 202 and/or the backhaul connection 230 from the wireless AP to the broadband communication network 203 degrades, e.g., due to network loading as the WLAN AP 202 is typically shared among multiple wireless devices or due to a change in signal strength or interference on the WLAN 206 connection, the quality of service for the direct connection can be suboptimal. As the secondary wireless device 220 (and the user thereof) can be mobile, e.g., the user of the secondary wireless device 220 moving outside the range of the wireless access point 202 or switching to a different (and poorer performing) wireless access point 202 (not shown), the quality provided by the WLAN connection 206 for the direct connection to the remote device 310A or 310B can vary. Should the WLAN connection 206 or the backhaul connection 230 (or a combination of both) degrade such that the direct connection does not provide an acceptable quality, the active communication session between the secondary wireless device 220 and the remote device 310A or 310B can be transferred to a relayed connection through a primary wireless device 210, if available and able to provide acceptable performance for the relayed connection.

WLAN Connection Evaluation

In some embodiments, the secondary wireless device 220 includes a connection manager, which monitors performance of the active communication session as well as one or more possible wireless connections possible via one or more different radio access technologies available in the secondary wireless device 220. When performance metrics for a first hop of a WLAN connection 206 to the wireless AP 202 or for the backhaul connection 230 between the wireless AP 202 and the broadband communication network 203 degrade, the connection manager can determine that a relayed connection through a primary wireless device 210 can provide (or is likely to provide) improved performance for the active communication session. In some embodiments, the wireless connection manager evaluates a signal quality for the WLAN connection 206 between the secondary wireless device 220 and the wireless AP 202, e.g., a received signal strength indication (RSSI) or equivalent physical layer metric. The RSSI or equivalent can be averaged over a sliding window and compared to a signal strength threshold. The wireless connection manager can also measure an application layer metric, e.g., a real-time transport protocol (RTP) packet loss rate for the active communication session and/or an average nominal jitter value for a buffer and compare the measured application layer metrics to applicable thresholds. When a combination of the physical layer measurements and the application layer measurements indicate that performance of the WLAN connection 206 and/or the backhaul connection 230 does not satisfy a performance criterion for the active communication session (which can depend on the type of active communication session), the wireless connection manager can determine whether a relayed connection via a primary wireless device 210 is available and can provide acceptable performance in place of the direct connection. In a representative embodiment, audio quality for a Wi-Fi call can be evaluated by monitoring a physical layer metric, such as by comparing a running average of the Wi-Fi RSSI to a signal strength threshold value, e.g., −65 dBm, and by monitoring an application layer metric, such as by comparing an average RTP packet loss incurred during the Wi-Fi call to a packet loss threshold value, e.g., 20%, or by comparing an average nominal jitter buffer value of the Wi-Fi call to a jitter threshold value, e.g., 700 ms. When the RSSI is below the signal strength threshold value, the wireless connection manager can determine that the local WLAN connection 206 between the secondary wireless device 220 and the wireless AP is weak and that a relayed connection via a direct WPAN connection 204 to the primary wireless device 210 can be preferred. Alternatively, when the RS SI exceeds the signal strength threshold value, e.g., the local WLAN connection 206 is strong, but the measured RTP packet loss exceeds the packet loss threshold value or the measured jitter exceeds the jitter buffer value, the wireless connection manager can determine that the backhaul connection 230 (or another connection further upstream) does not provide acceptable performance and a relayed connection can be preferred. The relayed connection can use either the local WLAN connection 206 via the wireless AP 202 to relay packets between the primary wireless device 210 and the secondary wireless device 220 or a direct WPAN connection 204 between the primary wireless device 210 and the secondary wireless device 220. The primary wireless device 210 can provide a WWAN connection 208 to the remote device 310 A/B for the secondary wireless device 220. In some embodiments, the primary wireless device 210 and/or the secondary wireless device 220 can determine whether to use the WLAN connection 206 or the WPAN connection 204 for relaying packets based on a service being provided and bandwidth, throughput, or other quality of service requirements that the service of the active communication session requires. While RSSI and RTP packet loss are used as representative performance metrics to evaluate a connection, additional and/or alternative performance metrics can also be used. The primary wireless device 210 and/or the secondary wireless device 220 can use any combination of one or more physical layer metrics, e.g., signal strength, signal quality, signal-to-noise ratio, signal-to-interference-plus-noise ratio, interference levels, noise levels, bandwidth, throughput, achievable data rates, bit error rate, packet error rate, block error rate, channel quality indicators, modulation and coding schemes, rank indicators, multi-channel capability, etc. to evaluate a connection. Furthermore, the primary wireless device 210 and/or the secondary wireless device 220 can use any combination of one or more application layer metrics, e.g., end-to-end data throughput, packet loss rate, end-to-end jitter, audio quality, video quality, etc. to evaluate the connection.

In some embodiments, the secondary wireless device 220 can support direct termination of an active communication session, e.g., via the WLAN connection 206 through the wireless AP 202 and backhaul connection 230 to the broadband communication network 203 but does not have any fallback options available to use, such as a circuit-switched legacy cellular wireless network connection or a packet based cellular network connection (e.g., VoLTE), when the local WLAN connection 206 and/or the backhaul connection 230 deteriorates. As described above the secondary wireless device 220 can support transfer of the active communication session to a relayed connection through the primary wireless device 210 when poor performance is observed. In some embodiments, the secondary wireless device, 220 upon determination of the poor performance for the direct connection through the wireless AP 202, deregisters from an IMS core network element for a period of time, e.g., for at least thirty minutes, in order to ensure that subsequent communication sessions (after termination of the ongoing active communication session) avoid the use of direct connections and instead use relayed connections through an available primary wireless device 210 instead. After expiration of a timer associated with the blocking period, the secondary wireless device 220 can re-evaluate the performance of the local WLAN connection 206 and/or the backhaul connection 230 (or obtain performance metrics from another associated wireless device or network element, e.g., a server) to determine whether to re-enable direct connections at the secondary wireless device 220 via the wireless AP 202. Using direct connections, when available and satisfactory performance can be realized, can provide superior performance, e.g., higher rate audio and/or video connections and/or lower latency connections (fewer hops). By monitoring performance of the connections, the secondary wireless device 220 can also ensure connection reliability by transferring an active communication session between different connection types as required.

In some embodiments, a secondary wireless device 220 engaged in an active communication session with a remote device 310 A/B using a direct connection, such as the WLAN connection 206 to the wireless AP 202, can detect proximity of a primary wireless device 210 that can provide an alternative connection, e.g., a relayed connection. The secondary wireless device 220 can detect proximity of the primary wireless device 210 in response to determining performance degradation for the active communication session, or alternatively proactively upon establishment of or during the active communication session, to provide an option for a user of the secondary wireless device 220 whether to transfer the active communication session from the direct connection to a relayed connection through the primary wireless device 210. In response to detection of performance degradation of the active communication session via the direct connection, the secondary wireless device 220 can provide an indication to a user of the secondary wireless device, e.g., an audible and/or visual alert, that indicates actual (or probable) poor link quality and offers one or more options to transfer the active communication session, e.g., to an associated primary wireless device 210. In response to an input, e.g., via an input/output interface of the secondary wireless device 220, the active communication session can either remain on the direct connection or be transferred to a relayed connection through the primary wireless device 210. The transfer of the active communication session can occur without interruption or dropping of the active communication session, thereby allowing for seamless transfer of the active communication session between different connections.

In some embodiments, the secondary wireless device 220, during an active communication session, scans for proximity of a primary wireless device 210, e.g., by using peer-to-peer WLAN communication and/or using WPAN communication. In response to the scan, the primary wireless device 210 can advertise one or more available radio access technologies, and in particular a radio access technology on which the primary wireless device 210 is presently camped, to any secondary wireless devices 220 in proximity to the primary wireless device 210. In some embodiments, the information advertised can include one or more of a radio access technology type, such as GSM, UMTS, CDMA, LTE, LTE-A, etc., one or more media connection capabilities, e.g., VoLTE, CS voice, PS voice, CS video, PS video, SMS, MMS, iMessage, Wi-Fi calling, etc. When no primary wireless device 210 is detected in proximity to the secondary wireless device 220, the active communication session can continue on the direct connection, and the secondary wireless device 220 can scan periodically for the primary wireless device 210, which can come into proximity to the secondary wireless device 220. When the primary wireless device 210 is in proximity to the secondary wireless device 220, the secondary wireless device 220 can evaluated advertised information about radio access technologies and/or media connection capabilities of the primary wireless device 210 to ascertain whether the primary wireless device 210 can provide an alternative connection to the direct connection for the active communication session. In particular, the secondary wireless device 220 can determine whether the primary wireless device 210 is also subject to performance degradation, e.g., based on communication capabilities through a common congested wireless AP 202, or whether the alternative connection is able (or likely able) to provide superior performance to the present direct connection for the active communication session. When the primary wireless device 210 does not offer an option for a better performance connection, the active communication session can remain directly connected at the secondary wireless device 220 until an alternative connection with superior performance becomes available. In some embodiments, no suggestion of an option to move the active communication session is provided in this circumstance until a better alternative connection becomes available. In some embodiments, information observed, such as proximity of the primary wireless device 210 to the secondary wireless device 220 can be provided. In some embodiments, an indication of expected performance for different connections can be provided. In some embodiments, when the primary wireless device 210 is able to provide a better connection for the active communication session, an option to transfer the active communication session can be provided, e.g., via an input/output interface of the secondary wireless device 220, permitting the user an opportunity to transfer the active communication session. In response to the user requesting transfer of the active communication session (which can include in some embodiments a selection between several different options for the new connection), the active communication session can be transferred to the primary wireless device 210 and continued through a newly established (at least in part) connection, e.g., using a circuit-switched connection and/or packet-switched connection to an intermediate server through which the active communication session traverse. The transfer of the active communication session can occur without interruption of the connection and without knowledge of the remote device 310 A/B. Providing an option for transfer of active communication session based on monitoring of performance and availability of alternative connections through a primary wireless device 210 can improve the call connection stability for active communication sessions, and permits a user options for selecting a best radio access technology available on a best wireless device available at any point in time during the active communication session. Packet loss can be reduced and/or voice/video quality can be maintained or improved by transferring the active communication session among available connections through different wireless devices associated with the secondary wireless device 220.

Neighbor Assisted Network Selection

As described herein, primary wireless devices 210 and/or secondary wireless devices 220 include wireless connection management modules that can evaluate the availability and/or quality of actual, available, and/or potential connections to determine a best connection and/or best radio access technology to use for an existing active connection or for a connection to be established. A secondary wireless device 220 can be capable of forming a direct connection, such as a Wi-Fi call, or a relayed connection, such as a circuit-switched or VoLTE call through a primary wireless device 210 in proximity to the secondary wireless device 220. The secondary wireless device 220 and the primary wireless device 210 can be paired together as part of a set of associated wireless devices, e.g., through a common iCloud account or another similar service. When a secondary wireless device 220 is in an idle mode, e.g., not connected in an active communication session, the secondary wireless device 220 can select between use of a direct connection or a relayed connection. A wireless connection manager of the secondary wireless device 220 can determine a preferred radio access technology or connection capability to use for a newly established connection. Similarly, while in an active communication session, the wireless connection manager of the secondary wireless device 220 can switch between different connection types based on performance evaluations of existing and/or available connections. The wireless connection manager of the secondary wireless device 220 can determine whether a direct connection, e.g., via a wireless AP 202 can provide adequate quality for a direct connection to the secondary wireless device 220. Similarly, a wireless connection manager of the primary wireless device 210 can determine whether to establish a connection using a cellular radio access technology, e.g., circuit-switched or VoLTE, or a connection using IMS through a WLAN connection. As described hereinabove, the wireless communication managers can use any combination of physical layer (radio) metrics and end-to-end application layer (transport) metrics to determine whether an existing or potential connection through a wireless AP 202 can provide adequate performance for an active (or to be established) communication session. Accuracy of the radio access technology evaluation by the wireless connection manager can vary based on a connection state of the wireless device. When a wireless device is connected in an active communication session and/or when active background communication activity occurs, evaluation of the connection can be more accurate than when activity is infrequent or no active connection exists. When the wireless device is idle or not connected in an active communication session or sleeping (e.g., in a power save state), measurements can occur less frequently with fewer packets (or other communication) available to evaluate the connection. As such, accuracy of the evaluation of potential connections can be less accurate when a wireless device wakes from a sleep mode or otherwise uses idle mode measurements to determine which type of connection to use or recommend. In addition, there may be a conflict in recommendations for wireless connections between a primary wireless device 210 that is operating in an idle mode and a secondary wireless device 220 that is operating in a connected mode, where the secondary wireless device 220 terminates a direct connection and has information that is more up-to-date for connections via a wireless AP 202 that the primary wireless device 210. The primary wireless device 210, upon waking, may not recommend switching a direct connection for the secondary wireless device 220 to a relayed connection based on stale information about the quality of connections available through the wireless AP 202. Thus, cross device communication can be used to improve the accuracy and applicability of wireless radio access technology selection for active and/or to be established connections.

A wireless connection manager on a wireless device, e.g., on the secondary wireless device 220 and/or on the primary wireless device 210, can evaluate performance characteristics of an active communication session through one or more links used for the active communication session. For example, when the wireless device participates in a Wi-Fi call through the wireless AP 202, the wireless device can evaluate both the quality of the WLAN connection 206 between the wireless device and the wireless AP 202, as well as the performance characteristics of the backhaul connection 230 between the wireless AP 202 and the broadband communication network 203 (and/or as part of the end-to-end connection). The wireless device, e.g., the secondary wireless device 220, can evaluate any combination of one or more physical layer metrics and any combination of one or more application layer (transport layer) metrics during the active communication session between the wireless device and a remote device 310 A/B. In some embodiments, the secondary wireless device 220 communicates information about the performance characteristics of the WLAN connection 206 and/or of the backhaul connection 230 to additional wireless devices that are associated with the secondary wireless device 220, e.g., with any wireless devices that share the same wireless AP and/or the same service set identifier (SSID) and basic service set identifier (BSSID) pairs. The wireless connection manager of the secondary wireless device 220 can communicate information about the physical layer metrics and/or the application layer metrics, such as a measured RSSI, an RTP packet loss rate, a nominal jitter buffer value, a transmit/receive packet error rate, a packet loss rate, etc. In some embodiments, the wireless connection manager of the secondary wireless device 220 communicates measurements and/or a radio access technology recommendation with neighboring wireless devices using an out-of-band signaling mechanism, e.g., through a secondary connection and/or through a commonly accessible server, such as an iCloud server.

In some embodiments, the wireless connection manager evaluates downlink performance of an active communication session using a combination of physical layer metrics and application (transport) layer metrics as follows. In a representative embodiment, when a physical layer metric for the WLAN connection 206 exceeds a physical layer threshold, e.g., when a measured RSSI (instantaneous and/or average) exceeds a level, such as −65 dBm, and an application (transport) layer metric for the end-to-end connection exceeds an application layer threshold, e.g., average RTP packet loss exceeds 20%, or average nominal jitter buffer exceeds 700 ms, the wireless connection manager can conclude that a backhaul connection 230 (and/or a link further upstream) does not provide adequate performance. The wireless connection manager of the wireless device, e.g., the secondary wireless device 220, can notify additional wireless devices connected to the same wireless AP 202 (and/or connected to a set of wireless APs that form a common WLAN) of the performance and/or of a radio access technology recommendation for connections. In another representative embodiment, when a physical layer metric for the WLAN connection 206 does not exceed a physical layer threshold, e.g., Receive (RX) retry ratio less than 5%, and an application (transport) layer metric for the end-to-end connection exceeds an application layer threshold, e.g., average RTP packet loss exceeds 20%, or average nominal jitter buffer exceeds 700 ms, the wireless connection manager can also conclude that the backhaul connection 230 (and/or a link further upstream) does not provide adequate performance and therefore notify associated wireless devices of the measured performance and/or radio access technology recommendation. In a representative embodiment, the RX retry ratio can be defined as a number of RX packets that include a retry bit set divided by a total number of RX packets.

In some embodiments, the wireless connection manager evaluates uplink performance of an active communication session using a combination of physical layer metrics and application (transport) layer metrics as follows. In a representative embodiment, the wireless connection manager of the wireless device, e.g., the secondary wireless device 220, determines whether the backhaul connection 230 (or a link further upstream) does not provide adequate performance by evaluating whether the signal strength of the WLAN connection 206 between the wireless AP 202 and the secondary wireless device 220 exceeds a physical layer threshold, e.g., RSSI greater than −65 dBm, and for the same active communication session an average transmit (TX) packet error rate (PER) exceeds an application (transport) layer threshold, e.g., TX PER greater than 7%. When the WLAN connection 206 shows adequate signal strength and/or signal quality, the wireless connection manager of the secondary wireless device 220 can conclude that the packet error rate above a threshold level indicates that the backhaul connection 230 or another link further upstream is impeding performance of the active communication session.

In some embodiments, the wireless connection manager evaluates performance metrics for the backhaul connection 230 during an active communication session that uses a transmission control protocol (TCP) as follows. In a representative embodiment, the wireless connection manager determines whether e.g., the secondary wireless device 220, determines whether the backhaul connection 230 (or a link further upstream) does not provide adequate performance by evaluating whether the signal strength of the WLAN connection 206 between the wireless AP 202 and the secondary wireless device 220 exceeds a physical layer threshold, e.g., RSSI greater than −65 dBm, and for the same active communication session whether an application (transport) layer metric does not satisfy an application layer metric. For example, whether an average receive (RX) TCP packet loss rate exceeds an application (transport) layer threshold, e.g., RX TCP packet loss greater than X %, or whether an average round trip time (RTT) of the active communication session that uses TCP exceeds a time threshold, e.g., Y ms. The RSSI value can be either averaged or instantaneous. In another representative embodiment, the wireless connection manager evaluates performance based on whether a receive (RX) retry ratio falls below a threshold value, e.g., less than 5%, and either the average RX TCP packet loss exceeds a packet loss threshold value, e.g., X %, or an average RTT of the active communication session that sues TCP exceeds a time threshold, e.g., greater than Y ms. When the WLAN connection 206 shows adequate signal strength and/or signal quality, the wireless connection manager of the secondary wireless device 220 can conclude based on the application layer metrics that the backhaul connection 230 or another link further upstream affects negatively on performance of the active communication session.

In some embodiments, a wireless device can include a wireless connection manager that monitors one or more physical layer metrics for local wireless (radio air interface) connections and application (transport) layer metrics for end-to-end device-to-device connections during one or more active communication sessions. The wireless device can share information about the monitored physical layer metrics and/or application/transport layer metrics with one or more other associated wireless devices. For example, neighboring wireless devices within a geographic proximity (such as within reach of a WPAN or WLAN) and/or wireless devices associated together through a common account or service, such as an iCloud account can obtain directly from the wireless device or indirectly through a network based server the information (or portions thereof) about the monitored metrics. In some embodiments, the wireless device shares recommendations for radio access technology choices and/or particular connections to assist other wireless devices to select among one or more different available radio access technologies and/or particular connections to use for an existing or to be established connection by the "other" wireless device(s). In some embodiments, a "crowd-based" collection of information from multiple wireless devices can be used to assess available radio access technologies and/or connections and to influence decisions, such as made by wireless connection managers of wireless devices, when selecting a wireless network to use for an existing or to be established connection. In some embodiments, location information of the wireless devices and/or associated network equipment, such as wireless access points, can be used in conjunction with measurements to provide information about prevailing and/or recent past conditions for connections that use different radio access technologies. In some embodiments, a wireless device can assess whether one or more local connections are interference limited and/or whether one or more backhaul connections are limiting performance, and the wireless device can notify one or more neighboring wireless devices of the assessment, e.g., to assist in radio access technology and/or network and/or connection selection. In some embodiments, a wireless device shares measurements, such as physical layer measurements and/or application (transport) layer measurements, with other wireless devices connected to a common local access point (AP) to assist the other wireless devices in link evaluation. In some embodiments, network evaluation, performance evaluation, network measurements, connection measurements, noise/interference measurements, signal strength measurements, delay/latency measurements, or other measurements useful for communication link evaluation are shared among multiple wireless devices to assist with current/future link selection, to assist with mitigation of coexistence interference, and/or to select among multiple radio access technologies. In some embodiments, a wireless device co-located with one or more other wireless devices uses information gathered from at least one of the one or more other wireless devices to influence radio access technology selection, radio link selection, coexistence mitigation, network selection, and/or connection establishment decisions.

In some embodiments, the use of a combination of physical layer metrics and a combination of application layer metrics can be applied to a network that includes Internet of Things (IOT) applications. For example, in an IOT scenario, several co-located wireless devices can work together to evaluate wireless connections for a preferred radio access technology, which can change over time, and whether a link is limited in the backhaul (or further upstream) or limited locally, e.g., due to poor signal strength, poor signal quality, high noise levels, high interference levels, etc. Each wireless device that participates in the IOT scenario can include the capability to share measurement information and when including wireless connection manager capabilities to share recommended radio access technologies and/or wireless connections, particularly when multiple different wireless connections and/or radio access technologies can be available.

Representative Exemplary Methods

Figure 5A:
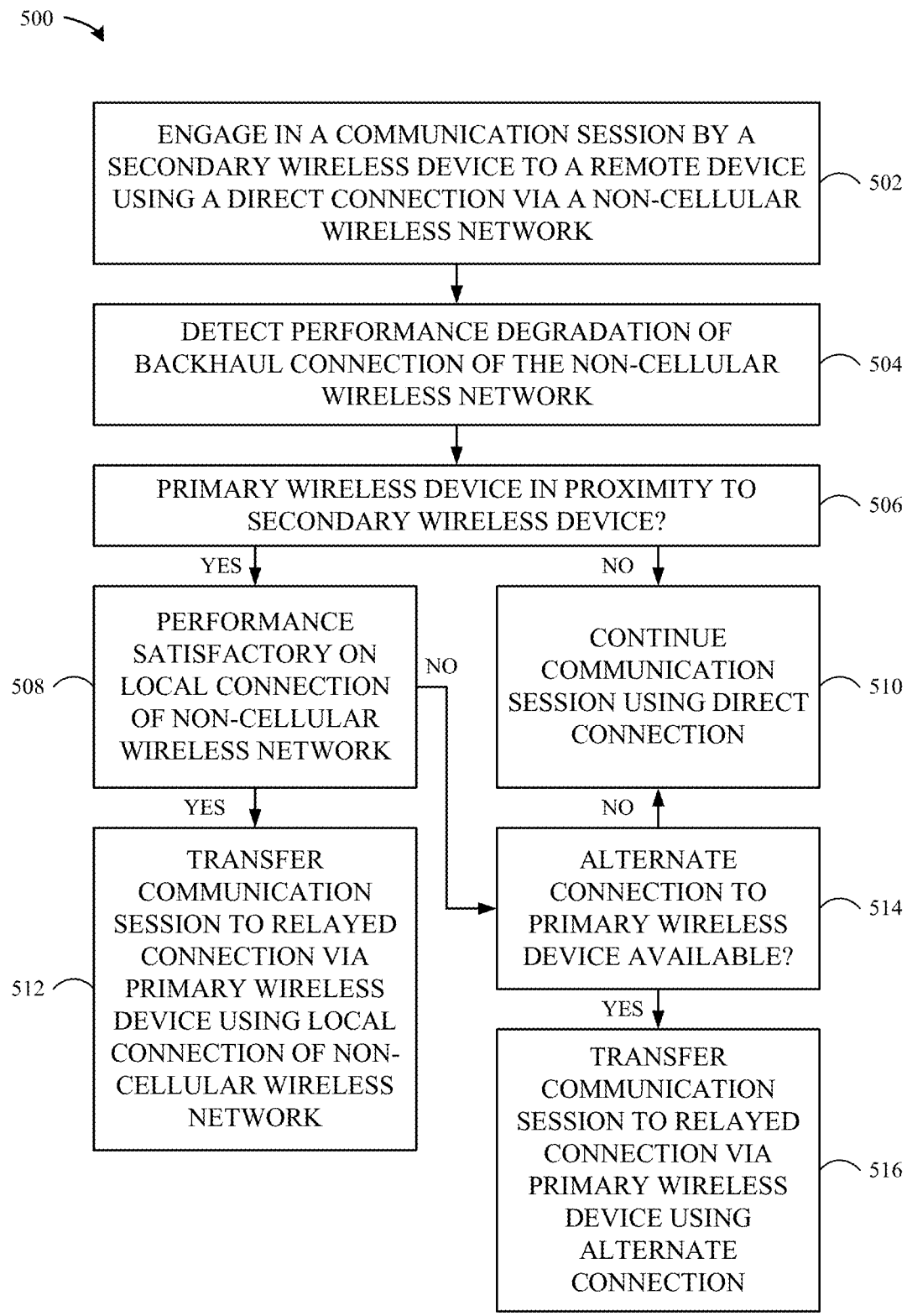
FIG. 5A illustrates a flowchart of an exemplary method performed by a wireless connection manager for managing wireless connections for an active communication session of a wireless device according to various embodiments of the present disclosure.

FIG. 5A illustrates a flowchart 500 of an exemplary method performed by a connection manager for managing connections for an active communication session of a wireless device, e.g., a secondary wireless device 220. In block 502, the secondary wireless device 220 engages in an active communication session with a remote device 310A or 310B using a direct connection via a non-cellular wireless network, e.g., via a WLAN connection 206 through a wireless AP 202 and further via a backhaul connection 230. In block 504, the secondary wireless device 220 detects a performance degradation of the backhaul connection 230 of the non-cellular wireless network. In block 506, the secondary wireless device 220 determines whether a primary wireless device 210 is in proximity to the secondary wireless device 220. When no primary wireless device 210 is in proximity to the secondary wireless device 220, the active communication session can continue to use the direct connection, as indicated in block 510. When a primary wireless device 210 is in proximity to the secondary wireless device 220, the secondary wireless device 220 can determine whether performance via a local connection, e.g., the WLAN connection 206, is satisfactory (e.g., satisfies any combination of one or more physical layer metrics or other relevant metrics). When the local connection can provide performance required for the active communication session, in block 512, the active communication session can be transferred from a direct connection that terminates on the secondary wireless device 220 to a relayed connection that terminates on the primary wireless device 210, where the primary wireless device 210 provides a relay of packets (e.g., audio, video, data, messaging, etc.) to the secondary wireless device 220 using the local connection of the non-cellular wireless network, e.g., via a WLAN connection 206 through the wireless AP 202. In some embodiments, the secondary wireless device 220 determines proximity of the primary wireless device 210 by scanning using a WPAN radio access technology, e.g., Bluetooth (classic or Low Energy) or Apple Wireless Direct Link (AWDL). In some embodiments, the secondary wireless device 220 requests that the primary wireless device 210 transfer the active communication session, by sending a request through an out-of-band signaling path, e.g., via a network-based server, such as provided as part of an iCloud service. In some embodiments, the primary wireless device 210 pulls the active communication session from the direct connection to the relayed connection by establishing a connection with a network based server through which packets for the active communication session traverse. When the secondary wireless device 220 determines that performance of the local connection of the non-cellular wireless network does not provide adequate performance for the active communication session, the secondary wireless device 220 can determine whether an alternate connection to the primary wireless device 210 is available, as indicated in block 514. For example, the secondary wireless device 220 can determine if a WPAN connection 204 or a direct "peer-to-peer" WLAN connection 206 can be established between the secondary wireless device 220 and the primary wireless device 210. When no alternate connection is available to relay the active communication session, the secondary wireless device 220 can continue the active communication session using the direct connection. When an alternate connection is available, in block 516, the active communication session can be transferred from the direct connection that terminates on the secondary wireless device 220 to a relayed connection that terminates on the primary wireless device 210 and relays audio/video/data/messaging packets for the active communication session using the alternate connection. In some embodiments, a wireless connection manager of the secondary wireless device 220 and/or a wireless connection manager of the primary wireless device 210 performs one or more actions to realize the exemplary method illustrated in FIG. 5A.

Figure 5B:
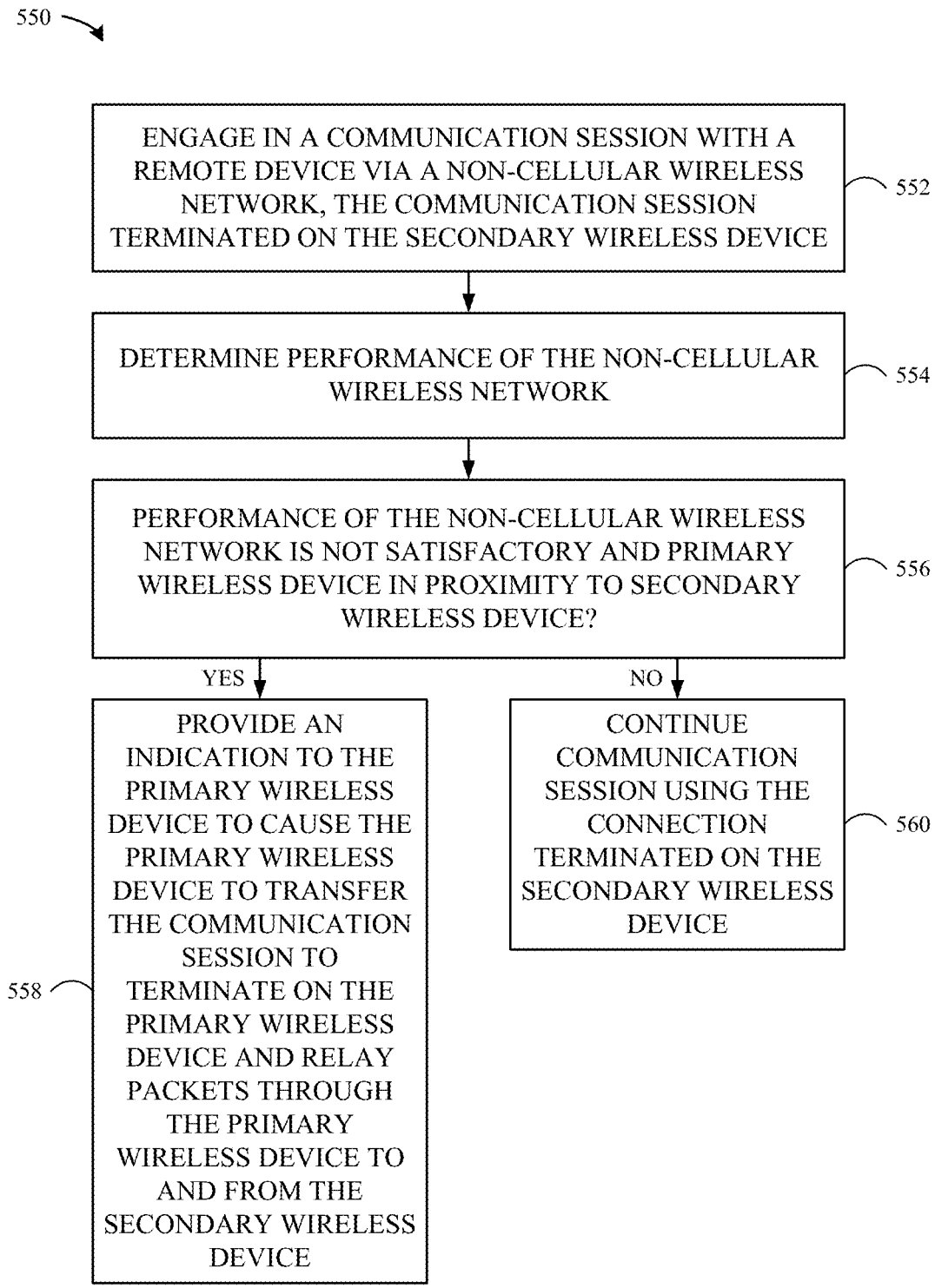
FIG. 5B illustrates a flowchart of another exemplary method performed by a wireless connection manager for managing wireless connections for an active communication session of a wireless device according to various embodiments of the present disclosure.

FIG. 5B illustrates a flowchart 550 of another exemplary method performed by a connection manager for managing connections for an active communication session of a wireless device, e.g., a secondary wireless device 220. In block 552, the secondary wireless device 220 engages in an active communication session with a remote device 310A or 310B using a connection via a non-cellular wireless network, e.g., via a WLAN connection 206 through a wireless AP 202 and further via a backhaul connection 230. In some embodiments, the connection for the communication session terminates directly on the secondary wireless device 220. In block 544, the secondary wireless device 220 determines performance of the non-cellular wireless network. In some embodiments, the secondary wireless device 220 determines performance of the non-cellular wireless network by determining performance of a local connection of the secondary wireless device 220 to the non-cellular wireless network (e.g., via WLAN connection 206) and/or of a backhaul connection of the non-cellular wireless network (e.g., via backhaul connection 230). In block 556, the secondary wireless device 220 determines whether a primary wireless device 210 is in proximity to the secondary wireless device 220 and whether the performance of the non-cellular wireless network is satisfactory (e.g., satisfies a performance criterion) for the communication session. When no primary wireless device 210 is in proximity to the secondary wireless device 220, or when the performance of the non-cellular wireless network is satisfactory for the communication session, the communication session can continue to use the connection terminated on the secondary wireless device 220, as indicated in block 560. When a primary wireless device 210 is in proximity to the secondary wireless device 220 and performance of the non-cellular wireless network is not satisfactory for the communication session, as indicated in block 558, the secondary wireless device 220 can provide an indication to the primary wireless device 210 to cause the primary wireless device 210 to transfer the communication session to terminate on the primary wireless device 210 and to relay packets through the primary wireless device 210 to and from the secondary wireless device 220, e.g., to provide a relayed connection with the secondary wireless device 220 via the primary wireless device 210 for the communication session. In some embodiments, the secondary wireless device 220 determines whether performance via a local connection, e.g., the WLAN connection 206 via the wireless AP 202 used for the communication session, is satisfactory (e.g., satisfies any combination of one or more physical layer metrics or other relevant metrics). When the local connection can provide performance required for the active communication session, the active communication session is transferred from a direct connection that terminates on the secondary wireless device 220 to a relayed connection that terminates on the primary wireless device 210, where the primary wireless device 210 provides a relay of packets (e.g., audio, video, data, messaging, etc.) to the secondary wireless device 220 using the local connection of the non-cellular wireless network, e.g., via a WLAN connection 206 through the wireless AP 202. In some embodiments, the secondary wireless device 220 determines proximity of the primary wireless device 210 by scanning using a WPAN radio access technology, e.g., Bluetooth (classic or Low Energy) or Apple Wireless Direct Link (AWDL). In some embodiments, the secondary wireless device 220 requests that the primary wireless device 210 transfer the active communication session, by sending a request through an out-of-band signaling path, e.g., via a network-based server, such as provided as part of an iCloud service. In some embodiments, the primary wireless device 210 pulls the active communication session from the direct connection to the relayed connection by establishing a connection with a network based server through which packets for the active communication session traverse. In some embodiments, when the secondary wireless device 220 determines that performance of the local connection of the non-cellular wireless network does not provide adequate performance for the active communication session, the secondary wireless device 220 can determine whether an alternate connection to the primary wireless device 210 is available. For example, the secondary wireless device 220 can determine if a WPAN connection 204 or a direct "peer-to-peer" WLAN connection 206 can be established between the secondary wireless device 220 and the primary wireless device 210. In some embodiments, when no alternate connection is available to relay the active communication session, the secondary wireless device 220 can continue the active communication session using the direct connection terminated on the secondary wireless device 220. In some embodiments, when an alternate connection is available, the active communication session can be transferred from the direct connection that terminates on the secondary wireless device 220 to a relayed connection that terminates on the primary wireless device 210 and relays audio/video/data/messaging packets for the active communication session using the alternate connection. In some embodiments, a wireless connection manager of the secondary wireless device 220 and/or a wireless connection manager of the primary wireless device 210 performs one or more actions to realize the exemplary method illustrated in FIG. 5B.

Figure 6:
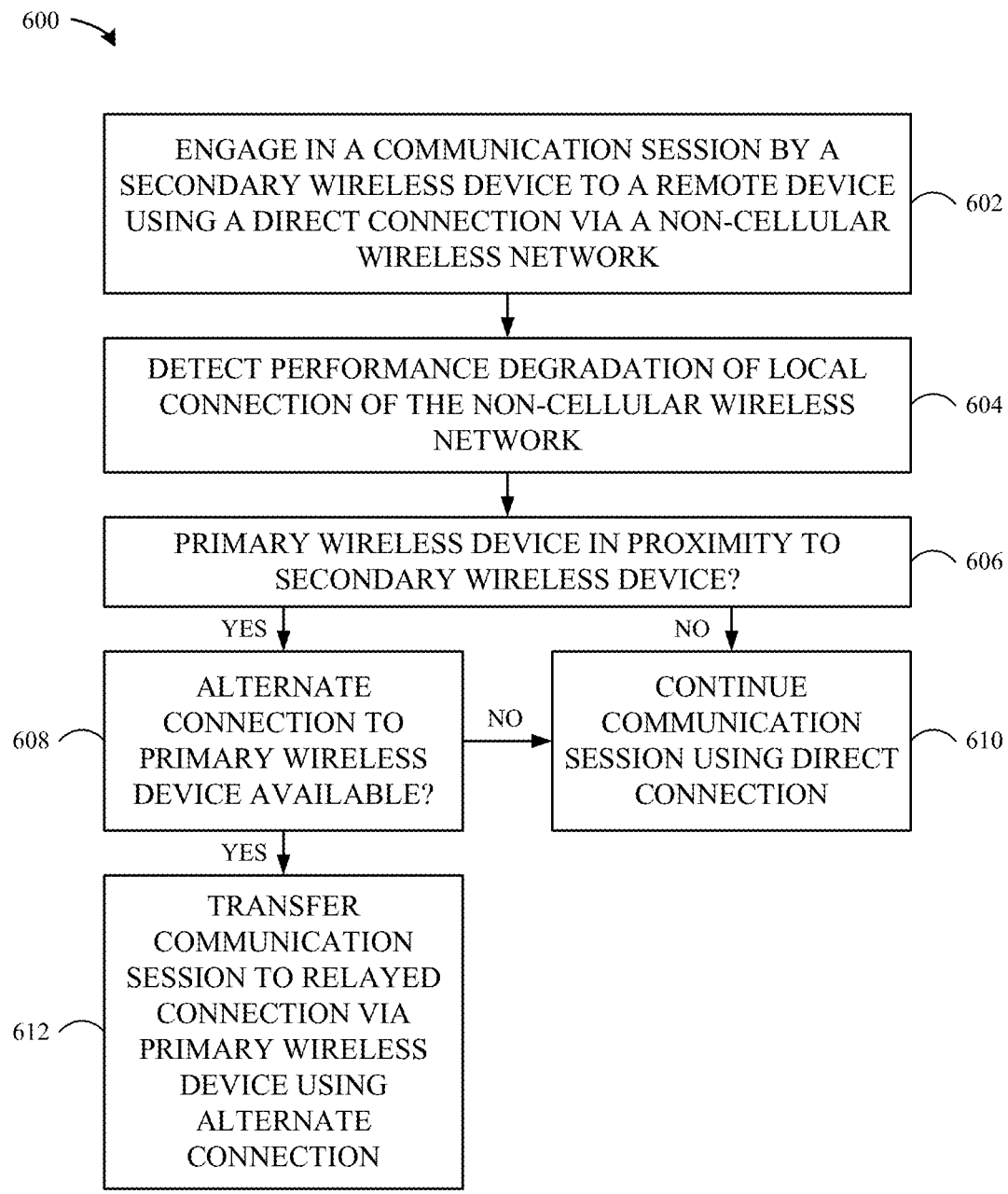
FIG. 6 illustrates a flowchart of a further exemplary method performed by a wireless connection manager for managing wireless connections for an active communication session of a wireless device according to various embodiments of the present disclosure.

FIG. 6 illustrates a flowchart 600 of another exemplary method performed by a connection manager for managing connections for an active communication session of a wireless device, e.g., a secondary wireless device 220. In block 602, the secondary wireless device 220 engages in an active communication session with a remote device 310 A/B using a direct connection via a non-cellular wireless network, e.g., via a WLAN connection 206 through a wireless AP 202 and further via a backhaul connection 230. In block 604, the secondary wireless device 220 detects a performance degradation of a local connection of the non-cellular wireless network, e.g., the WLAN connection 206 to the wireless AP 202. In block 606, the secondary wireless device 220 determines whether a primary wireless device 210 is in proximity to the secondary wireless device 220. When no primary wireless device 210 is in proximity to the secondary wireless device 220, the active communication session can continue to use the direct connection, as indicated in block 610. When a primary wireless device 210 is in proximity to the secondary wireless device 220 and the local connection performance is inadequate (as detected in block 604), the secondary wireless device 220 can determine whether an alternate connection to the primary wireless device 210 is available, as indicated in block 608. For example, the secondary wireless device 220 can determine if a WPAN connection 204 can be established between the secondary wireless device 220 and the primary wireless device 210. In some embodiments, the secondary wireless device 220 can evaluate the WPAN connection 204 as part of detecting proximity of the primary wireless device 210. When no alternate connection is available to relay the active communication session, the secondary wireless device 220 can continue the active communication session using the direct connection as indicated in block 610. When an alternate connection is available, in block 612, the active communication session can be transferred from the direct connection that terminates at the secondary wireless device 220 to a relayed connection that terminates at the primary wireless device 210 and relays audio/video/data/messaging packets for the active communication session using the alternate connection. In some embodiments, a wireless connection manager of the secondary wireless device 220 and/or a wireless connection manager of the primary wireless device 210 performs one or more actions to realize the exemplary method illustrated in FIG. 6.

Figure 7:
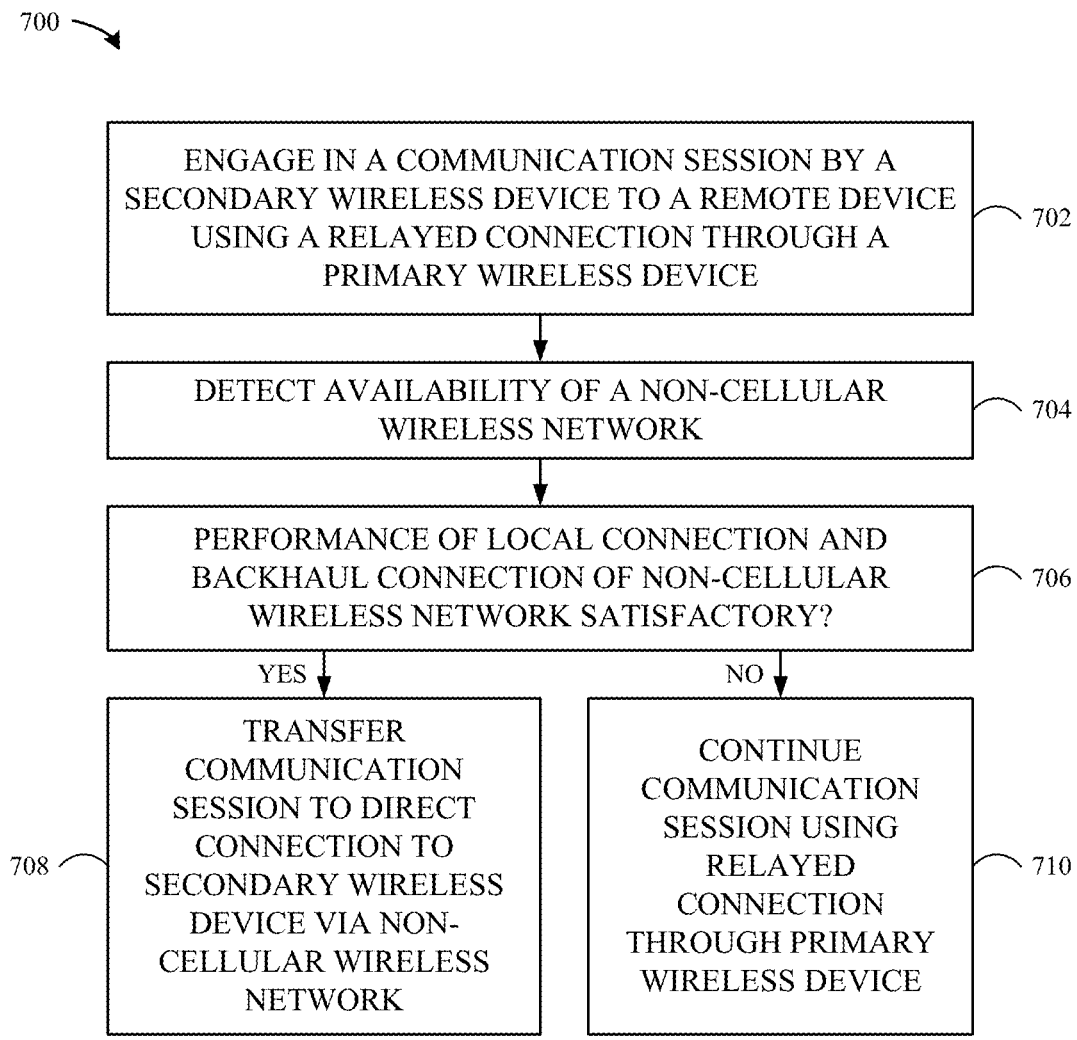
FIG. 7 illustrates a flowchart of an additional exemplary method performed by a wireless connection manager for managing wireless connections for an active communication session of a wireless device according to various embodiments of the present disclosure.

FIG. 7 illustrates a flowchart 700 of a further exemplary method performed by a connection manager for managing connections for an active communication session of a wireless device, e.g., a secondary wireless device 220. In block 702, the secondary wireless device 220 engages in an active communication session with a remote device 310 A/B using a relayed connection through a primary wireless device 210. The relayed connection, in some embodiments, can be realized at least in part using a WPAN connection 204 directly between the primary wireless device 210 and the secondary wireless device 220 and/or indirectly via a WLAN connection 206 through a wireless AP 202 to which both the primary wireless device 210 and the secondary wireless device 220 are connected. In block 704, the secondary wireless device 220 detects availability of a non-cellular wireless network through which a direct connection can be used for the active communication session. In some embodiments, the non-cellular wireless network can include at least in part a WLAN network, such as provided by for the relayed connection. In block 706, the secondary wireless device 220, alone or in conjunction with the primary wireless device 210, can determine whether performance via a local connection of the non-cellular wireless network and a backhaul connection of the non-cellular wireless network can provide adequate performance for the active communication session. In some embodiments, the secondary wireless device 220 can account for the type of active communication session ongoing when evaluating the performance of the non-cellular wireless network. When the performance of the local connection and the backhaul connection of the non-cellular wireless network meets requirements for the active communication session, the active communication session can be transferred from a relayed connection via the primary wireless device 210 to a direct connection to the secondary wireless device 220. In some embodiments, the primary wireless device 210 pushes the active communication session to the secondary wireless device 220, e.g., in conjunction with communication with one or more network-based servers, such as an IMS network element and/or an iCloud server. In some embodiments, the secondary wireless device 220 pulls the active communication session over from the primary wireless device 210. When performance of the local connection and/or the backhaul connection cannot meet performance requirements for the active communication session, in block 610, the active communication session can continue using the relayed connection through the primary wireless device 210. In some embodiments, the secondary wireless device 220 can re-evaluate performance of the non-cellular wireless network periodically or on demand (e.g., based on user input) to determine whether performance warrants transferring the active communication session from the relayed connection to a direct connection. Similarly, after transfer of an active communication session, the secondary wireless device 220 and/or the primary wireless device 210 can continue to monitor performance characteristics, such as physical layer attributes of local connections and/or application metrics for end-to-end links, to determine whether to transfer the active communication session between a relayed connection and a direct connection.

Representative Exemplary Apparatus

Figure 8:
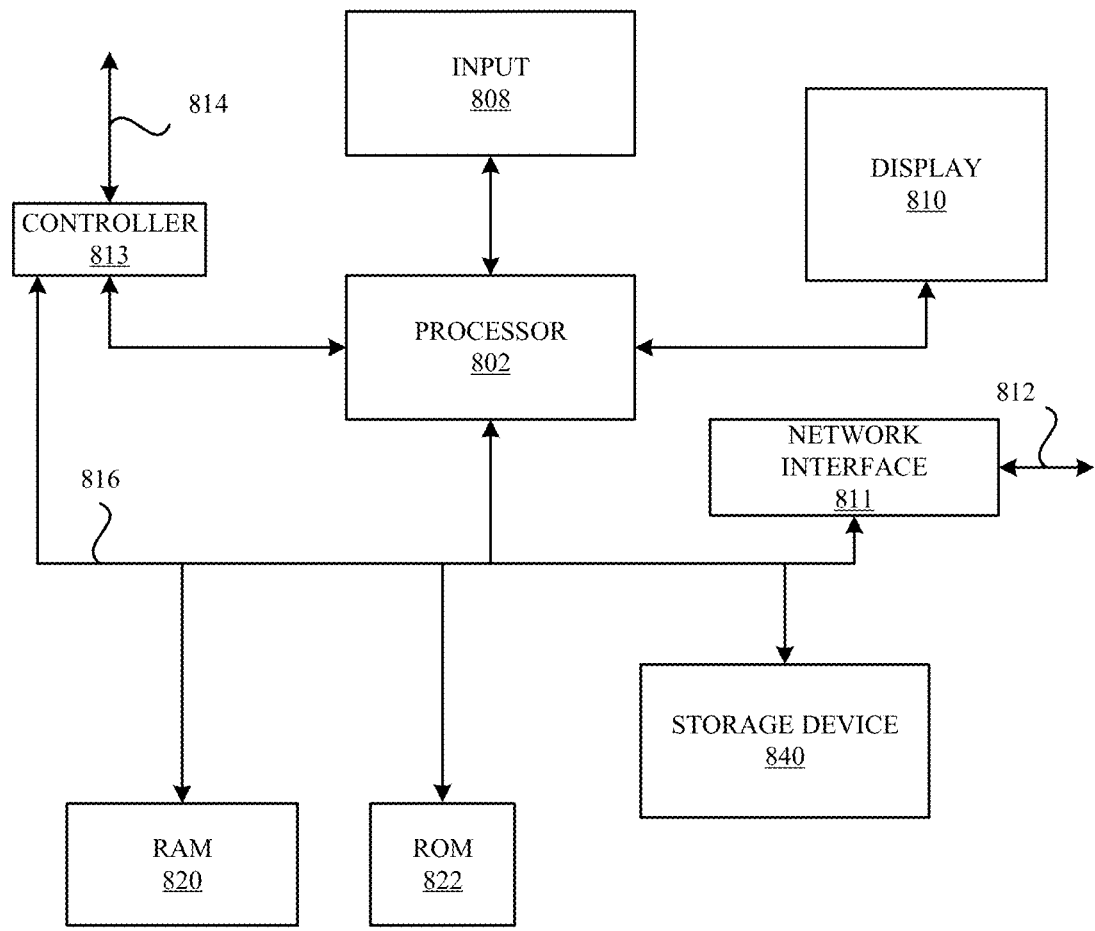
FIG. 8 illustrates in block diagram format an exemplary computing device that can be used to implement the various components and techniques described herein according to various embodiments of the present disclosure.

FIG. 8 illustrates in block diagram format an exemplary computing device 800 that can be used to implement the various components and techniques described herein, according to some embodiments. In particular, the detailed view of the exemplary computing device 800 illustrates various components that can be included in the wireless device 102 illustrated in FIG. 1. As shown in FIG. 8, the computing device 800 can include a processor 802 that represents a microprocessor or controller for controlling the overall operation of computing device 800. The computing device 800 can also include a user input device 808 that allows a user of the computing device 800 to interact with the computing device 800. For example, the user input device 808 can take a variety of forms, such as a button, keypad, dial, touch screen, audio input interface, visual/image capture input interface, input in the form of sensor data, etc. Still further, the computing device 800 can include a display 810 (screen display) that can be controlled by the processor 802 to display information to the user (for example, information relating to incoming, outgoing, or active communication session). A data bus 816 can facilitate data transfer between at least a storage device 840, the processor 802, and a controller 813. The controller 813 can be used to interface with and control different equipment through an equipment control bus 814. The computing device 800 can also include a network/bus interface 811 that couples to a data link 812. In the case of a wireless connection, the network/bus interface 811 can include wireless circuitry, such as a wireless transceiver and/or baseband processor.

The computing device 800 also includes a storage device 840, which can comprise a single storage or a plurality of storages (e.g., hard drives), and includes a storage management module that manages one or more partitions within the storage device 840. In some embodiments, storage device 840 can include flash memory, semiconductor (solid state) memory or the like. The computing device 800 can also include a Random Access Memory ("RAM") 820 and a Read-Only Memory ("ROM") 822. The ROM 822 can store programs, utilities or processes to be executed in a non-volatile manner. The RAM 820 can provide volatile data storage, and stores instructions related to the operation of the computing device 800.

Figure 9:
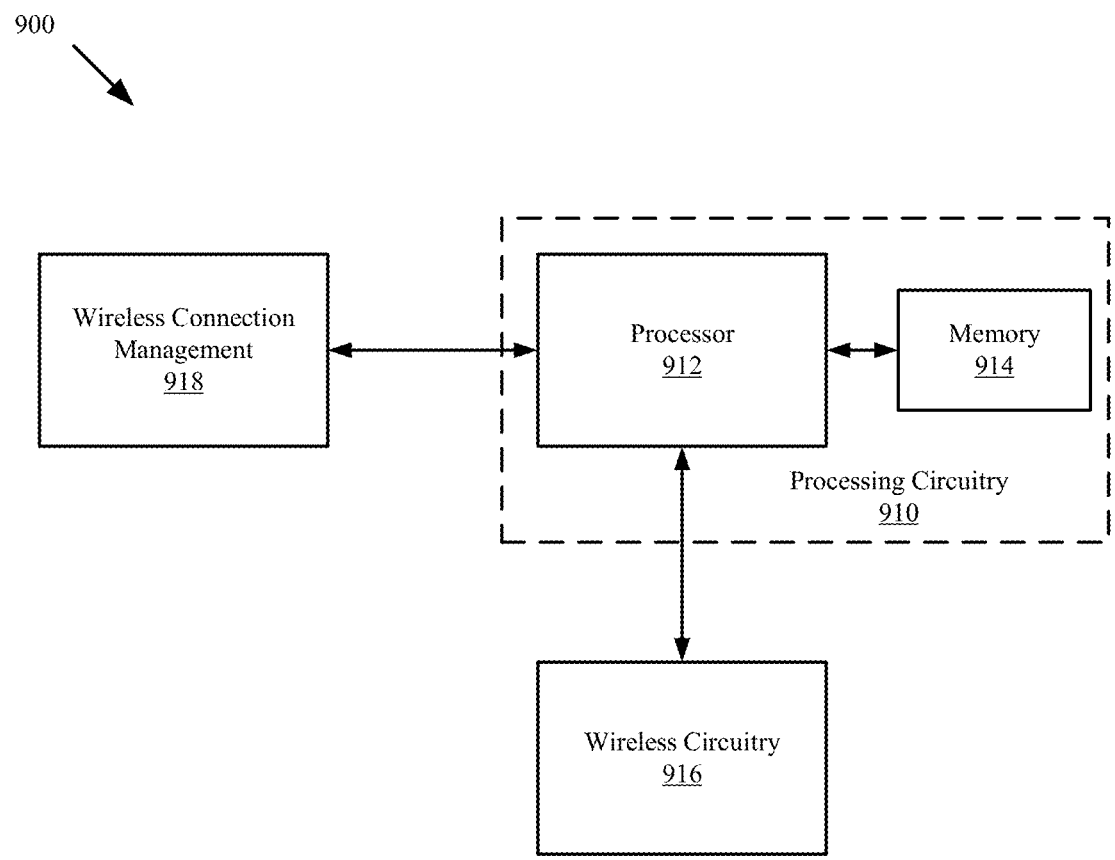
FIG. 9 illustrates in block diagram format an example representative set of elements of a wireless device that can be used to implement the various components and techniques described herein according to various embodiments of the present disclosure.

FIG. 9 illustrates a block diagram of an example apparatus 900 that can be implemented in a wireless device 102, e.g., a primary wireless device 210 and/or a secondary wireless device 220 and/or to realize, at least in part, a wireless connection management mechanism, in accordance with some embodiments. It will be appreciated that the components, devices or elements illustrated in and described with respect to FIG. 9 may not be mandatory and thus some may be omitted in certain embodiments. Additionally, some embodiments can include further or different components, devices or elements beyond those illustrated in and described with respect to FIG. 9. Further, it will be appreciated that, in some embodiments, one or more components of the apparatus 900 can be distributed across a plurality of computing devices that can collectively provide the functionality for wireless connection management.

In some example embodiments, the apparatus 900 can include processing circuitry 910 that is configurable to perform actions in accordance with one or more example embodiments disclosed herein. In this regard, the processing circuitry 910 can be configured to perform and/or control performance of one or more functionalities of the apparatus 900 in accordance with various embodiments, and thus can provide means for performing functionalities of the apparatus 900 in accordance with various embodiments. The processing circuitry 910 can be configured to perform data processing, application execution and/or other processing and management services according to one or more embodiments.

In some embodiments, the apparatus 900 or a portion(s) or component(s) thereof, such as the processing circuitry 910, can include one or more chipsets, each of which can include one or more chips. The processing circuitry 910 and/or one or more further components of the apparatus 900 can therefore, in some instances, be configured to implement an embodiment on a chipset comprising one or more chips. In some example embodiments in which one or more components of the apparatus 900 are embodied as a chipset, the chipset can be capable of enabling a computing device(s) to operate wireless device in accordance with embodiments as disclosed herein.

In some example embodiments, the processing circuitry 910 can include a processor 912 and, in some embodiments, such as that illustrated in FIG. 9, can further include memory 914 (or another non-transitory storage medium). The processing circuitry 910 can be in communication with or otherwise control wireless circuitry 916 and/or a wireless connection management module 918.

The processor 912 can be embodied in a variety of forms. For example, the processor 912 can be embodied as various processing hardware-based means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 912 can include a plurality of processors. The plurality of processors can be in operative communication with each other and can be collectively configured to perform one or more functionalities of the apparatus 900 as described herein. In embodiments including a plurality of processors, the plurality of processors can be implemented on a single computing device, or can be distributed across a plurality of computing devices that can collectively provide functionality of a wireless device, such as the primary wireless device 210 and/or the secondary wireless device 220. In some example embodiments, the processor 912 can be configured to execute instructions that can be stored in the memory 914 or that can be otherwise accessible to the processor 912. As such, whether configured by hardware or by a combination of hardware and software, the processor 912 can be capable of performing operations according to various embodiments while configured accordingly.

In some embodiments, the memory 914 can include one or more memory devices. The memory 914 can include fixed and/or removable memory devices. In some embodiments, the memory 914 can provide a non-transitory computer-readable storage medium that can store computer program instructions that can be executed by the processor 912. In this regard, the memory 914 can be configured to store information, data, applications, instructions and/or the like for enabling the apparatus 900 to carry out various functions in accordance with one or more embodiments. In embodiments including a plurality of memory devices, the plurality of memory devices can be implemented on a single computing device, or can be distributed across a plurality of computing devices that can collectively provide functionality of a wireless device. In some embodiments, the memory 914 can be in communication with one or more of the processor 912, wireless circuitry 916, or wireless connection management module 918 via one or more busses for passing information among components of the apparatus 900.

The apparatus 900 can further include wireless circuitry 916. The wireless circuitry 916 can include one or more interface mechanisms for enabling communication with other devices and/or networks. For example, the wireless circuitry 916 can be configured to enable the apparatus 900 to communicate over one or more networks, such as the WWAN 108, the WLAN 106, and/or the WPAN 104. The apparatus 900 can include multiple sets of wireless circuitry 916, which can each provide communication in accordance with a wireless communication protocol. In various embodiments, the wireless circuitry 916 can include, for example, an antenna (or multiple antennas) and supporting hardware and/or software for enabling communications with one or more wireless communication networks, such as a cellular network. In some embodiments, the wireless circuitry 616 can be referred to as a communication interface(s) and include a combination of requisite hardware, software, or firmware to provide wireless communications in accordance with one or more wireless communication protocols, such as a Wi-Fi protocol, an IEEE 802.11 wireless communication protocol, a cellular wireless communication protocol, a WLAN protocol, a WPAN protocol, e.g., such as Bluetooth or Apple Wireless Direct Link (AWDL).

The apparatus 900 can further include a wireless connection management module 918. The wireless connection management module 918 can be embodied as various means, such as circuitry, hardware, a computer program product comprising computer readable program instructions stored on a non-transitory computer readable medium (for example, the memory 914) and executed by a processing device (for example, the processor 912), or some combination thereof. In some embodiments, the processor 912 (or the processing circuitry 910) can include, or otherwise control the wireless connection management module 918. The wireless connection management module 918 can be configured to support management of transitions of between various wireless connections, e.g., direct connections and/or relayed connections in support of one or more example embodiments.

REPRESENTATIVE EMBODIMENTS

In an embodiment, a method for managing connections for an active communication session by a secondary wireless device includes the secondary wireless device: (i) engaging in a communication session with a remote device via a non-cellular wireless network, where the communication session direction terminates on the secondary wireless device, (ii) determining performance of the non-cellular wireless network, (iii) and when the performance of the non-cellular wireless network does not satisfy a performance criterion and a primary wireless device is in proximity to the secondary wireless device, providing an indication to the primary wireless device to cause the primary wireless device to transfer the communication session to terminate on the primary wireless device, where packets for the communication session are relayed via the primary wireless device to and from the secondary wireless device.

In some embodiments, determining performance of the non-cellular wireless network includes determining performance of one or more of: a local connection of the secondary wireless device to the non-cellular wireless network, or a backhaul connection of the non-cellular wireless network. In some embodiments, the packets for the communication session are relayed to and from the secondary wireless device using the local connection of the non-cellular wireless network when performance of the local connection satisfies the performance criterion for the communication session. In some embodiments, the packets for the communication session are relayed to and from the secondary wireless device using an alternate connection between the primary wireless device and the secondary wireless device when performance of the local connection does not satisfy the performance criterion for the communication session. In some embodiments, the method further includes the secondary wireless device determining whether the primary wireless device is in proximity to the secondary wireless device. In some embodiments, the secondary wireless device determines proximity of the primary wireless device by scanning in accordance with a wireless personal area network (WPAN) communication protocol. In some embodiments, the primary wireless device terminates the communication session with the remote device via a wireless wide area network connection. In some embodiments, the secondary wireless device evaluates performance of the backhaul connection using any combination of one or more application layer metrics. In some embodiments, the secondary wireless device evaluates performance of the local connection using any combination of one or more physical layer metrics. In some embodiments, in response to the indication from the secondary wireless device to cause the primary wireless device to transfer the communication session, the primary wireless device establishes a connection to a network based server associated with the communication session to transfer packets for the communication session from terminating at the secondary wireless device to terminating at the primary wireless device. In some embodiments, the secondary wireless device determines performance of the backhaul connection or of the local connection using information obtained from one or more associated wireless devices.

In an embodiment, a method for managing connections for an active communication session by a secondary wireless device includes the secondary wireless device: (i) engaging in a communication session with a remote device via a non-cellular wireless network, wherein the communication session directly terminates on the secondary wireless device, (ii) determining performance of the non-cellular wireless network, and (iii) when the performance of the non-cellular wireless network does not satisfy a performance criterion and a primary wireless device is in proximity to the secondary wireless device: displaying an option to transfer the communication session to terminate on the primary wireless device, and in response to an input to transfer the communication session, providing an indication to the primary wireless device to cause the primary wireless device to transfer the communication session, where packets for the communication session are relayed via the primary wireless device to and from the secondary wireless device.

In some embodiments, the method further includes the secondary wireless device determining whether the primary wireless device is in proximity to the secondary wireless device. In some embodiments, the secondary wireless device determines proximity of the primary wireless device by scanning in accordance with a wireless personal area network (WPAN) communication protocol. In some embodiments, the method further includes the secondary wireless device receiving from the primary wireless device an indication of a radio access technology available for connection via the primary wireless device. In some embodiments, the method further includes the secondary wireless device evaluating whether performance of the radio access technology available for connection via the primary wireless device satisfies the performance criterion for the communication session. In some embodiments, determining performance of the non-cellular wireless network includes determining performance of one or more of: a local connection of the secondary wireless device to the non-cellular wireless network, or a backhaul connection of the non-cellular wireless network. In some embodiments, the packets for the communication session are relayed to and from the secondary wireless device using the local connection of the non-cellular wireless network when performance of the local connection satisfies the performance criterion for the communication session. In some embodiments, the packets for the communication session are relayed to and from the secondary wireless device using an alternate connection between the primary wireless device and the secondary wireless device when performance of the local connection does not satisfy the performance criterion for the communication session.

In an embodiment, a secondary wireless device includes processing circuitry including a processor and a memory storing instructions that, when executed by the processor, cause the secondary wireless device to perform a method including: (i) engaging in a communication session with a remote device via a non-cellular wireless network, wherein the communication session directly terminates on the secondary wireless device, (ii) determining performance of the non-cellular wireless network, and (iii) when the performance of the non-cellular wireless network does not satisfy a performance criterion and a primary wireless device is in proximity to the secondary wireless device, providing an indication to the primary wireless device to cause the primary wireless device to transfer the communication session to terminate on the primary wireless device, where packets for the communication session are relayed via the primary wireless device to and from the secondary wireless device.

In some embodiments, execution of the instructions further causes the secondary wireless device to determine whether the primary wireless device is in proximity to the secondary wireless device. In some embodiments, the secondary wireless device determines proximity of the primary wireless device by scanning in accordance with a wireless personal area network (WPAN) communication protocol. In some embodiments, execution of the instructions further causes the secondary wireless device to receive from the primary wireless device an indication of a radio access technology available for connection via the primary wireless device. In some embodiments, execution of the instructions further causes the secondary wireless device evaluate whether performance of the radio access technology available for connection via the primary wireless device satisfies the performance criterion for the communication session. In some embodiments, the secondary wireless device determines performance of the non-cellular wireless network by at least determining performance of one or more of: a local connection of the secondary wireless device to the non-cellular wireless network, or a backhaul connection of the non-cellular wireless network. In some embodiments, the packets for the communication session are relayed to and from the secondary wireless device using the local connection of the non-cellular wireless network when performance of the local connection satisfies the performance criterion for the communication session. In some embodiments, the packets for the communication session are relayed to and from the secondary wireless device using an alternate connection between the primary wireless device and the secondary wireless device when performance of the local connection does not satisfy the performance criterion for the communication session.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard storage drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for managing connections between a wireless device and a remote device connected to a packet switched network, the method comprising:
by the wireless device:
establishing a communication session via a wireless access point with the remote device through a non-cellular wireless network;
receiving advertising information from a second wireless device within range of the wireless device using a non-cellular radio access technology, wherein the advertising information indicates the second wireless device is connected to a cellular wireless network via a cellular radio access technology;
detecting a degradation in a performance of the communication session over the non-cellular wireless network; and responsive to detecting the degradation in the performance of the communication session over the non-cellular wireless network;
transferring the communication session to the second wireless device connected to the cellular wireless network, wherein the second wireless device relays packets received from the cellular wireless network via the cellular radio access technology to the wireless device via the non-cellular radio access technology;
disallowing the wireless device to transfer the communication session to connect via the wireless access point for a predetermined threshold blocking period of time after transfer to the second wireless device; and
after the predetermined threshold blocking period of time, allowing the wireless device to transfer the communication session to connect via the wireless access point.

2. The method of claim 1, wherein detecting the degradation in the performance of the communication session over the non-cellular wireless network comprises detecting a degradation of a local connection between the wireless device and the wireless access point.

3. The method of claim 1, wherein detecting the degradation in the performance of the communication session over the non-cellular wireless network comprises detecting a degradation of a backhaul connection between the wireless access point and a broadband communication network.

4. The method of claim 1, wherein the second wireless device is connected, via the cellular wireless network, to an enhanced packet core network that includes an Internet Protocol (IP) Multimedia Subsystem (IMS) configured to manage connections between the cellular wireless network and a packet switched network.

5. The method of claim 1, the method further comprising:
by the wireless device:
evaluating a performance of a connection established between the second wireless device and the cellular wireless network; and
transferring the communication session to the second wireless device when the performance of the connection established between the second wireless device and the cellular wireless network exceeds the performance of the communication session over the non-cellular wireless network.

6. The method of claim 1, wherein the advertising information includes a radio access technology type of the cellular radio access technology and media connection capabilities available through the cellular radio access technology.

7. The method of claim 1, wherein the wireless device shares performance evaluations for one or more connections established through various radio access technologies with a third wireless device associated with the wireless device.

8. The method of claim 7, wherein the third wireless device is connected to the wireless access point via a service set identifier (SSID) or a basic service set identifier (BSSID) utilized by the wireless device to connect to the wireless access point.

9. The method of claim 7, wherein the performance evaluations are shared through a service implemented by a server device, and wherein the wireless device and the third wireless device are associated via an account associated with the service.

10. The method of claim 1, wherein the wireless device cannot connect directly to the cellular wireless network through the cellular radio access technology.

11. A wireless device configured to manage connections to a remote device connected to a packet switched network, the wireless device comprising:
a processor; and
a memory connected to the processor and storing instructions that, when executed by the processor, cause the wireless device to:
detect a primary wireless device within a range of a non-cellular radio access technology;
receive advertising information associated with the primary wireless device using the non-cellular radio access technology to connect to a non-cellular wireless network, wherein the advertising information indicates the primary wireless device is connected to a cellular wireless network via a cellular radio access technology;
transfer a communication session established with the remote device to the primary wireless device connected to the cellular wireless network, wherein the primary wireless device relays data received from the cellular wireless network via the cellular radio access technology to the wireless device via the non-cellular radio access technology;
disallow transfer of the communication session to connect directly to the wireless device bypassing the primary wireless device for a predetermined threshold blocking period of time after transfer to the primary wireless device; and
after the predetermined threshold blocking period of time, allowing the wireless device to transfer the communication session to connect directly to the wireless device bypassing the primary wireless device.

12. The wireless device of claim 11, wherein the instructions, when executed by the processor, further cause the wireless device to:
evaluate a performance of a local connection to the non-cellular wireless network; and
transfer the communication session to the primary wireless device when a performance evaluation of a connection of the primary wireless device to the cellular wireless network exceeds the performance of the local connection to the non-cellular wireless network.

13. The wireless device of claim 11, wherein the advertising information specifies a radio access technology type for the cellular radio access technology comprising one of a fourth generation (4G) radio access technology or a fifth generation (5G) radio access technology.

14. The wireless device of claim 11, wherein the non-cellular radio access technology is configured to connect to a wireless personal area network (WPAN) and the wireless device receives the advertising information via the WPAN.

15. The wireless device of claim 11, wherein the communication session is associated with a voice over long-term evolution (VoLTE) call.

16. The wireless device of claim 11, wherein the primary wireless device is connected, via the cellular wireless network, to an enhanced packet core network that includes an Internet Protocol (IP) Multimedia Subsystem (IMS) configured to manage connections between the cellular wireless network and a packet switched network.

17. A primary wireless device configured to relay a communication session between a secondary wireless device and a remote device connected to a packet switched network, the primary wireless device comprising:
- a processor; and
- a memory connected to the processor and storing instructions that, when executed by the processor, cause the primary wireless device to:
    - advertise one or more available cellular radio access technologies accessible to the secondary wireless device via the primary wireless device;
    - receive an indication from the secondary wireless device that a communication session is to be transferred from the secondary wireless device to the primary wireless device;
    - responsive to the indication, establish a connection with a cellular wireless network via one of the available cellular radio access technologies; and
    - relay data received from the remote device via the connection to the secondary wireless device via a second connection established via a non-cellular radio access technology,
    - wherein the secondary wireless device:
        - disallows transfer of the connection to connect directly at the secondary wireless device bypassing the primary wireless device for a predetermined threshold blocking period of time; and
        - after the predetermined threshold blocking period of time, allows the secondary wireless device to transfer the communication session to connect directly to the secondary wireless device bypassing the primary wireless device.

18. The primary wireless device of claim 17, wherein:
the primary wireless device and the secondary wireless device are connected to a wireless access point via the non-cellular radio access technology, and
the second connection is established through the wireless access point.

19. The primary wireless device of claim 17, wherein the instructions further cause the primary wireless device to provide a performance evaluation of the connection to the secondary wireless device.

20. The primary wireless device of claim 17, wherein the one or more available cellular radio access technologies are advertised via a wireless personal area network (WPAN).

* * * * *